US007739583B2

(12) United States Patent
Barrus et al.

(10) Patent No.: US 7,739,583 B2
(45) Date of Patent: Jun. 15, 2010

(54) MULTIMEDIA DOCUMENT SHARING METHOD AND APPARATUS

(75) Inventors: John Barrus, Menlo Park, CA (US); Gregory Wolff, Redwood City, CA (US); Ame Elliott, San Francisco, CA (US); Kim McCall, Menlo Park, CA (US); Bradley Rhodes, Palo Alto, CA (US); Stephen Savitzky, San Jose, CA (US)

(73) Assignee: Ricoh Company, Ltd. (JP)

( * ) Notice: Subject to any disclaimer, the term of this patent is extended or adjusted under 35 U.S.C. 154(b) by 854 days.

(21) Appl. No.: 10/404,927

(22) Filed: Mar. 31, 2003

(65) Prior Publication Data

US 2004/0193571 A1 Sep. 30, 2004

(51) Int. Cl.
*G06F 17/00* (2006.01)
(52) U.S. Cl. .................. 715/201; 715/202; 715/203; 715/204; 715/229; 715/230; 358/462
(58) Field of Classification Search ............... 715/500, 715/201, 202, 203, 204, 229, 230; 358/462
See application file for complete search history.

(56) References Cited

U.S. PATENT DOCUMENTS

| | | | |
|---|---|---|---|
| 4,417,239 A | | 11/1983 | Demke et al. |
| 4,823,303 A | | 4/1989 | Terasawa |
| 4,907,973 A | | 3/1990 | Hon et al. |
| 4,987,447 A | * | 1/1991 | Ojha ........................... 399/84 |
| 4,998,215 A | | 3/1991 | Black et al. |
| 5,060,135 A | * | 10/1991 | Levine et al. ............... 715/769 |
| 5,142,579 A | | 8/1992 | Anderson |
| 5,153,831 A | | 10/1992 | Yianitos |
| 5,161,037 A | * | 11/1992 | Saito ........................... 358/468 |
| 5,168,371 A | * | 12/1992 | Takayanagi .................. 358/296 |
| 5,191,611 A | | 3/1993 | Lang |
| 5,225,900 A | * | 7/1993 | Wright ........................ 358/501 |
| 5,243,381 A | * | 9/1993 | Hube ........................... 399/84 |
| 5,247,575 A | | 9/1993 | Sprague et al. |
| 5,255,389 A | * | 10/1993 | Wang .......................... 707/10 |
| 5,267,303 A | * | 11/1993 | Johnson et al. ......... 379/100.07 |
| 5,280,609 A | * | 1/1994 | MacPhail ....................... 707/1 |
| 5,299,123 A | * | 3/1994 | Wang et al. ..................... 707/2 |

(Continued)

FOREIGN PATENT DOCUMENTS

CN 1097394 C 12/2002

(Continued)

OTHER PUBLICATIONS

"Flowport, Effective Document Management," brochure, 2 pages total.
"Flowport, Paper that knows where it's going," specification sheet, 2 pages total.
<http://www.zdnet.com.au/printfriendly?AT=2000023555-20270277-4>, "Captured! Three document capture systems tested, Nov. 28, 2002," visited on Apr. 29, 2003, 9 pages total.
Xerox FlowPort Software, Solutions for the Legal Market from Xerox, 2001 Xerox Corporation, 4 pages total.

(Continued)

*Primary Examiner*—Stephen S Hong
*Assistant Examiner*—Matthew J Ludwig
(74) *Attorney, Agent, or Firm*—Townsend and Townsend and Crew LLP

(57) ABSTRACT

A document sharing system includes producing an updatable collection of multimedia documents. A collection coversheet provides a facile medium for handling and distributing large collections of documents. The system includes techniques for subsequent access to the collection, including printing all or portions of the collection.

39 Claims, 25 Drawing Sheets

U.S. PATENT DOCUMENTS

| | | | |
|---|---|---|---|
| 5,309,359 A | 5/1994 | Katz et al. | |
| 5,349,658 A | 9/1994 | O'Rourke et al. | |
| 5,369,508 A * | 11/1994 | Lech et al. | 358/462 |
| 5,384,703 A | 1/1995 | Withgott et al. | |
| 5,404,295 A | 4/1995 | Katz et al. | |
| 5,418,948 A | 5/1995 | Turtle | |
| 5,438,426 A | 8/1995 | Miake et al. | |
| 5,442,795 A | 8/1995 | Levine et al. | |
| 5,444,476 A | 8/1995 | Conway et al. | |
| 5,448,375 A * | 9/1995 | Cooper et al. | 358/403 |
| 5,459,307 A * | 10/1995 | Klotz, Jr. | 235/454 |
| 5,468,371 A | 11/1995 | Nelson et al. | |
| 5,479,600 A | 12/1995 | Wroblewski et al. | |
| 5,481,353 A | 1/1996 | Hicks et al. | |
| 5,481,666 A | 1/1996 | Nguyen et al. | |
| 5,490,217 A | 2/1996 | Wang et al. | |
| 5,499,108 A * | 3/1996 | Cotte et al. | 358/400 |
| 5,548,666 A | 8/1996 | Yoneda et al. | |
| 5,581,682 A * | 12/1996 | Anderson et al. | 715/530 |
| 5,586,238 A | 12/1996 | Murata | |
| 5,596,700 A | 1/1997 | Darnell et al. | |
| 5,638,543 A | 6/1997 | Pedersen et al. | |
| 5,661,799 A | 8/1997 | Nagel et al. | |
| 5,666,414 A | 9/1997 | Micali | |
| 5,680,223 A * | 10/1997 | Cooper et al. | 358/403 |
| 5,680,636 A | 10/1997 | Levine et al. | |
| 5,682,330 A | 10/1997 | Seaman et al. | |
| 5,682,540 A | 10/1997 | Klotz, Jr. et al. | |
| 5,686,957 A | 11/1997 | Baker | |
| 5,690,496 A | 11/1997 | Kennedy | |
| 5,694,470 A | 12/1997 | Jernbacker | |
| 5,694,559 A | 12/1997 | Hobson et al. | |
| 5,710,874 A * | 1/1998 | Bergen | 358/1.16 |
| 5,715,381 A * | 2/1998 | Hamilton | 358/1.15 |
| 5,717,879 A | 2/1998 | Moran et al. | |
| 5,721,897 A | 2/1998 | Rubinstein | |
| 5,734,752 A | 3/1998 | Knox | |
| 5,734,753 A | 3/1998 | Bunce | |
| 5,737,599 A | 4/1998 | Rowe et al. | |
| 5,748,805 A | 5/1998 | Withgott et al. | |
| 5,751,283 A | 5/1998 | Smith | |
| 5,751,287 A | 5/1998 | Hahn et al. | |
| 5,754,308 A * | 5/1998 | Lopresti et al. | 358/403 |
| 5,754,939 A * | 5/1998 | Herz et al. | 455/3.04 |
| 5,760,767 A | 6/1998 | Shore et al. | |
| 5,761,655 A | 6/1998 | Hoffman | |
| 5,761,686 A * | 6/1998 | Bloomberg | 715/529 |
| 5,764,368 A | 6/1998 | Shibaki et al. | |
| 5,765,176 A * | 6/1998 | Bloomberg | 715/514 |
| 5,774,260 A | 6/1998 | Petitto et al. | |
| 5,778,397 A | 7/1998 | Kupiec et al. | |
| 5,781,785 A | 7/1998 | Rowe et al. | |
| 5,784,616 A | 7/1998 | Horvitz | |
| 5,793,365 A | 8/1998 | Tang et al. | |
| 5,802,175 A | 9/1998 | Kara | |
| 5,802,294 A | 9/1998 | Ludwig et al. | |
| 5,812,664 A | 9/1998 | Bernobich et al. | |
| 5,819,301 A | 10/1998 | Rowe et al. | |
| 5,832,474 A | 11/1998 | Lopresti et al. | |
| 5,838,317 A | 11/1998 | Bolnick et al. | |
| 5,857,185 A | 1/1999 | Yamaura | |
| 5,860,074 A | 1/1999 | Rowe et al. | |
| 5,870,552 A * | 2/1999 | Dozier et al. | 709/219 |
| 5,870,770 A | 2/1999 | Wolfe | |
| 5,873,107 A | 2/1999 | Borovoy et al. | |
| 5,892,536 A | 4/1999 | Logan et al. | |
| 5,903,538 A | 5/1999 | Fujita et al. | |
| 5,903,646 A | 5/1999 | Rackman | |
| 5,933,498 A | 8/1999 | Schneck | |
| 5,933,829 A | 8/1999 | Durst et al. | |
| 5,933,841 A | 8/1999 | Schumacher et al. | |
| 5,943,679 A | 8/1999 | Niles et al. | |
| 5,946,678 A | 8/1999 | Aalbersberg | |
| 5,950,187 A | 9/1999 | Tsuda | |
| 5,978,477 A | 11/1999 | Hull et al. | |
| 5,982,507 A | 11/1999 | Weiser et al. | |
| 5,986,655 A | 11/1999 | Chiu et al. | |
| 5,986,692 A | 11/1999 | Logan et al. | |
| 5,987,226 A | 11/1999 | Ishikawa et al. | |
| 5,987,454 A | 11/1999 | Hobbs | |
| 5,990,934 A | 11/1999 | Nalwa | |
| 5,999,173 A | 12/1999 | Ubillos | |
| 6,006,218 A | 12/1999 | Breese et al. | |
| 6,009,177 A | 12/1999 | Sudia | |
| 6,009,442 A * | 12/1999 | Chen et al. | 715/522 |
| 6,021,403 A | 2/2000 | Horvitz et al. | |
| 6,026,409 A | 2/2000 | Blumenthal | |
| 6,028,601 A | 2/2000 | Machiraju et al. | |
| 6,055,542 A | 4/2000 | Nielsen et al. | |
| 6,094,648 A | 7/2000 | Aalbersberg | |
| RE36,801 E | 8/2000 | Logan et al. | |
| 6,101,503 A | 8/2000 | Cooper et al. | |
| 6,106,457 A | 8/2000 | Perkins et al. | |
| 6,182,090 B1 | 1/2001 | Peairs | |
| 6,262,724 B1 | 7/2001 | Crow et al. | |
| 6,298,145 B1 | 10/2001 | Zhang et al. | |
| 6,301,586 B1 | 10/2001 | Yang et al. | |
| 6,301,660 B1 | 10/2001 | Benson | |
| 6,332,147 B1 | 12/2001 | Moran et al. | |
| 6,339,825 B2 | 1/2002 | Pensak et al. | |
| 6,369,811 B1 | 4/2002 | Graham et al. | |
| 6,373,585 B1 | 4/2002 | Mastie et al. | |
| 6,408,330 B1 | 6/2002 | DeLaHuerga | |
| 6,409,401 B1 | 6/2002 | Petteruti et al. | |
| 6,466,329 B1 | 10/2002 | Mukai | |
| 6,470,096 B2 | 10/2002 | Davies et al. | |
| 6,519,360 B1 | 2/2003 | Tanaka | |
| 6,529,920 B1 | 3/2003 | Arons et al. | |
| 6,535,298 B2 | 3/2003 | Winter et al. | |
| 6,545,687 B2 | 4/2003 | Scott et al. | |
| 6,611,628 B1 | 8/2003 | Sekiguchi et al. | |
| 6,657,702 B1 | 12/2003 | Chui et al. | |
| 6,674,923 B1 | 1/2004 | Shih et al. | |
| 6,687,383 B1 | 2/2004 | Kanevsky et al. | |
| 6,714,216 B2 | 3/2004 | Abe | |
| 6,724,494 B1 | 4/2004 | Danknick | |
| 6,735,324 B1 | 5/2004 | McKinley et al. | |
| 6,751,732 B2 | 6/2004 | Strobel et al. | |
| 6,752,317 B2 | 6/2004 | Dymetman et al. | |
| 6,775,651 B1 | 8/2004 | Lewis et al. | |
| 6,807,303 B1 | 10/2004 | Kim et al. | |
| 6,824,044 B1 | 11/2004 | Lapstun et al. | |
| 6,892,193 B2 * | 5/2005 | Bolle et al. | 706/20 |
| 6,947,557 B1 | 9/2005 | Megiddo et al. | |
| 7,002,700 B1 | 2/2006 | Motamed | |
| 7,031,965 B1 | 4/2006 | Moriya et al. | |
| 7,131,058 B1 | 10/2006 | Lapstun | |
| 7,131,061 B2 | 10/2006 | MacLean et al. | |
| 7,165,268 B1 | 1/2007 | Moore et al. | |
| 7,263,671 B2 | 8/2007 | Hull et al. | |
| 7,313,340 B2 | 12/2007 | Savitzky et al. | |
| 7,509,569 B2 | 3/2009 | Barrus et al. | |
| 7,536,638 B2 | 5/2009 | Barrus et al. | |
| 2001/0037408 A1 | 11/2001 | Thrift et al. | |
| 2002/0004807 A1 | 1/2002 | Graham et al. | |
| 2002/0006100 A1 | 1/2002 | Cundiff, Sr. et al. | |
| 2002/0016819 A1 | 2/2002 | Sugimoto et al. | |
| 2002/0097426 A1 | 7/2002 | Gusmano et al. | |
| 2002/0131065 A1 | 9/2002 | Sweetland et al. | |
| 2002/0159637 A1 | 10/2002 | Echigo et al. | |
| 2002/0163653 A1 | 11/2002 | Struble et al. | |
| 2002/0171857 A1 | 11/2002 | Hisatomi et al. | |
| 2002/0199149 A1 | 12/2002 | Nagasaki et al. | |
| 2003/0051214 A1 | 3/2003 | Graham et al. | |

| | | | |
|---|---|---|---|
| 2003/0084462 | A1 | 5/2003 | Kubota et al. |
| 2003/0088582 | A1 | 5/2003 | Pflug |
| 2003/0117652 | A1 | 6/2003 | Lapstun |
| 2003/0130952 | A1 | 7/2003 | Bell et al. |
| 2003/0137545 | A1 | 7/2003 | Hoehn et al. |
| 2003/0160898 | A1 | 8/2003 | Baek et al. |
| 2003/0163552 | A1 | 8/2003 | Savitzky et al. |
| 2003/0184598 | A1 | 10/2003 | Graham |
| 2004/0090462 | A1 | 5/2004 | Graham |
| 2004/0128613 | A1 | 7/2004 | Sinisi |
| 2004/0194026 | A1 | 9/2004 | Barrus et al. |
| 2004/0240541 | A1 | 12/2004 | Chadwick et al. |
| 2005/0022122 | A1 | 1/2005 | Barrus et al. |
| 2006/0136450 | A1 | 6/2006 | Barrus et al. |
| 2006/0190544 | A1 | 8/2006 | Chikirivao et al. |
| 2006/0242567 | A1 | 10/2006 | Rowson et al. |
| 2006/0288236 | A1 | 12/2006 | McCue |
| 2007/0050696 | A1 | 3/2007 | Piersol et al. |
| 2009/0254972 | A1 | 10/2009 | Huang et al. |

FOREIGN PATENT DOCUMENTS

| | | |
|---|---|---|
| EP | 378 848 A2 | 7/1990 |
| EP | 459 174 B1 | 12/1991 |
| EP | 737 927 B1 | 10/1996 |
| EP | 762 297 A2 | 3/1997 |
| EP | 802 492 A1 | 10/1997 |
| EP | 0864959 A2 | 9/1998 |
| EP | 1 001 605 A2 | 5/2000 |
| EP | 1 133 170 A2 | 9/2001 |
| GB | 2 137 788 A | 10/1984 |
| GB | 2 156 118 A | 10/1985 |
| GB | 2 234 609 A | 2/1991 |
| GB | 2 290 898 A | 1/1996 |
| JP | 08-139846 A | 5/1996 |
| JP | 8-297677 A | 11/1996 |
| JP | 09-091301 A | 4/1997 |
| JP | H09-091301 A | 4/1997 |
| JP | 11-143908 A | 5/1999 |
| JP | 2002-295557 A | 10/2000 |
| JP | 2001-005805 A | 1/2001 |
| JP | 2002-157240 A | 5/2002 |
| JP | 2002-207579 A | 7/2002 |
| JP | 2003-085015 A | 2/2003 |
| JP | 06-261717 A | 9/2006 |
| WO | WO 99/18523 A1 | 4/1999 |
| WO | WO 99/38099 A1 | 7/1999 |
| WO | WO 02/098670 A2 | 12/2002 |

OTHER PUBLICATIONS

Lutz, Raymond, "BrowseFax Initiative," MPFA Information Site, downloaded from internet, http://www.mtpa.org/pub/browsefax_wp.htm on May 14, 2004.

"c:\...\9149920c.wpd—unmodified" Screen Shots of document created in Corel WordPerfect, 4 pages (Apr. 30, 2002).

"FaceIt Face Recognition Technology Frequently Asked Technical Questions," Visionics Corporation, 36 pages.

"Flexible JAMM Screenshots," downloaded from Internet site httpJ/simon.cs.ct.edu/-jamm May 4, 2000.

"FlowPort™ Xerox Image Routing Software FlowPort Overview," 2003, 4 pages total.

"Video Mail Retrieval Using Voice" Cambridge University Engineering Department Computer Laboratory and Olivetti Research Laboratory summary of research found at http//svr-www.enq.cam.ac.uk/research/projects/vrnr/ (1997).

Abdel-Mottaleb, M. et al., "Face Detection in Complex Environments From Color Images," IEEE ICIP 622-626, 1999.

Acrobat Reader Version 2.0 (software application), Adobe Systems Incorporated, screenshots Figures 1-10 (1994).

Adobe Acrobat Reader 3.0 screen dumps (fig. 1-3), 1996.

Adobe Premiere (video editing software) from http://www.adobe.com (2002).

Adobe Systems, Inc., "Adobe Photoshop 4.0 User Guide for Macintosh and Windows," 1996, Title Page, Copyright Page, Chap. 2, pp. 30-31.

Apple Macintosh system 7 reference manual, pp. 30-31 (1991).

Arons, B. "SpeechSkimmer: A System for Interactively Skimming Recorded Speech," ACM Transactions on Computer-Human Interaction, 4(1):3-38 (1997).

Ball et al, "Software Visualization in the Large," IEEE Computer, vol. 29, No. 4, Apr. 1996,.pp. 33-43. http//www.computer.org/computer/co1996/r4033abs.htm.

Begole et al. "Flexible Collaboration Transparency: Supporting Worker Independence In Replicated Application-Sharing Systems," ACM Transactions On Computer-Human Interaction, Jun. 1999, pp. 95-132, vol. 6, No. 2.

Begole et al., "Supporting Worker Independence in Collaboration Transparency," ACM 0- 58113-034-1/98/11, Virginia Polytechnic Institute and State University, pp. 133-142, 1998.

Begole et al., "Supporting Worker Independence In Collaboration Transparency," technical report from the Computer Science Department of Virginia Tech, doc. ID: ncstrl.vatech_cs/TR-98- 12 (1998).

Begole etal:, "Flexible Collaboration Transparency," doc. ID: ncstri.vatach_cs/TR-98-11, Virginia Polytechnic Institute and State University, 1998.

Bobick et al., "A State Based Approach to the Representation and Recognition of Gesture," IEEE Trans. On Pattern Analysis and Machine Intelligence, pp. 1325-1337, 1997.

Boguraev et al., "Salience/based Content Characterization of Text Documents," in Proceedings of Workshop on Intelligent Scalable Text Summarization at the ACL/EACL Conference, Madrid, Spain, 12 pages, Jul. 7-12, 1997.

Boguraev et al., "Salience-Based Content Characterization Of Text Documents," ACL/EACL97Intelligent Scalable Text Summarization Workshop Program, Jul. 11, 1997, 14 pages.

Boreczky, J. et al., "An Interactive Comic Book Presentation for Exploring Video," Conference on Human Factors in Computing Systems (CHI 2000), ACM Press, pp. 185-192, 2000.

Boykin et al., "Improving Broadcast News Segmentation Processing," IEEE Multimedia 99, 1999.

Boykin et al., "Machine Learning of Event Segmentation for News on Demand," Communications of the ACM, 43:35-41, 2000.

Brandow et al., "Automatic Condensation of Electronic Publications by Sentence Selection," Information Processing and Management, 31(5):875-685, 1995.

Brown et al., "Automatic Content-Based Retrieval of Broadcast News," ACM Multimedia 5, San Francisco, CA, 1995.

Byrd, D., "A Scrollbar-based visualization for Document Navigation," doc. ID:xxx:cs.IR/9902028, Computing Research Repository: Information Retrieval, 1999.

Chen et al., "Emotion Recognition from Audiovisual Information," Proc. IEEE Workshop on Multimedia Signal Processing, Los Angeles, CA, USA, pp. 83-88, 1998.

Chen et al., "ViBE: A Video Indexing and Browsing Environment," Proceedings of the SPIE Conference on Multimedia Storage and Archiving Systems, Sep. 20-22, 1999, Boston 3846:148-164, 1999.

Chiu et al., "Automatically Linking Multimedia Meeting Documents by Image Matching," Proceedings of Hypertext 00, ACM, New York, pp. 244-245, 2000.

Chiu et al., "NoteLook: Taking Notes in Meetings. with Digital Video and Ink," ACM Multimedia 99 Orlando, 1999.

Christel et al., "Evolving Video Skims into Useful Multimedia Abstractions," Proceedings of the CHI 98 Conference on Human Factors in Computing Systems, pp. 171-178 Los Angeles, CA, Apr. 1998.

Christel et al., "Information Visualization Within a Digital Video Library," Journal of Intelligent Information Systems, 11:235-257, 1998.

Damiani. E. et al. "A Fine-Grained Access Control System for XML Documents," ACM Transactions on Information and System Security. May 2002, pp. 169-202. vol. 5, No. 2.

Dellaert et al., Recognizing Emotion in Speech; Proceedings ICSLP 96, Fourth International Conference on Spoken Language Processing New York, IEEE vol. 1970-1973, Cat. No. 96TH8206), 1996.

Dimitrova et al., "Video Keyframe Extraction and Filtering: A Keyframe is not a Keyframe to Everyone," CIKM 1997:113-120,1997.

Divakaran, A. et al., "Video Browsing System Based on Compressed Domain Feature Extraction," IEEE Transactions on Consumer Electronics 46:637-644.

Doermann et al., "Applying Algebraic and Differential Invariants for Logo Recognition," Machine Vision and Applications 9:73-86, 1996.

Donato et al., Classifying Facial Actions, IEEE Trans. on Pattern Analysis and Machine Intelligence, 21:974-989,1999.

Dorai, C. et al., Perceived Visual Motion Descriptors from MPEG-2 for content based HDTV annotation and retrieval, IEEE 3rd Workshop on Multimedia Signal Processing, 147-152 (1999).

Drucker et al, "SmartSkip: Consumer Level Browsing, and Skipping of Digital Video Content," Paper: Technology to Help People Find Information, vol. No. 4, Issue No. 1, pp. 219-226, Minneapolis, Minnesota, USA, Apr. 20-25, 2002.

Erol, B. et al., "Local Motion Descriptors," IEEE Workshop on Multimedia Signal Processing, 467-472, 2001.

Essa et al., "Coding Analysis Interpretation and Recognition of Facial Expressions" IEEE. Trans. on Pattern Analysis and Machine Intelligence, 19:757-763, 1997.

European Search Report, EP 05008745, Jun. 6, 2005, 4 pages.

Foote, J. et al., "An Intelligent Media Browser Using Automatic Multimodal Analysis," ACM Multimedia 98, ACM Press, pp. 375-380, Bristol, UK, 1998.

Foote, J. et al., "FlyCam: Practical Panoramic Video and Automatic Camera Control," Proceedings of International Conference on Multimedia & Expo, 3:1419-1422, 2000.

Foote, J. et al.,"Finding Presentations in Recorded Meeting Using Audio and Video Features" ICASPP., 3029-3032,1999.

Furui et al., "Japanese Broadcast News Transaction and Information Extraction," Communications of the ACM, 43(2):71-73, Feb. 2000.

Gauvain et al., "Transcribing Broadcast News for Audio and Video Indexing," Communications of the ACM, 43:64-70, 2000.

Gibbon, David C., "Generating Hypermedia Documents from Transcriptions of Television Programs Using Parallel Text Alignment," Handbook of Internet and Multimedia Systems and Applications, CRC Press, 1998.

Glance et al., "Knowledge Pump: Community-Centered Collaborative Filtering", Xerox Research Centre Europe, Grenoble Laboratory, Oct. 27, 1997, pp. 1-5.

Gliedman, J., Virtual Office Managers; Computer Shopper, 18(9):290, 1998.

Gordon, "Using Annotated Video as in Information Retrieval Interface," ACM Proceedings of the 5th International Conference on Intelligent User Interfaces, New Orleans, pp. 133-140, 2000.

Grasso et al., "Augmenting Recommender Systems By Embedding Interfaces Into Practices," Proceedings of the 33rd Hawaii International Conference on System Sciences 2000 IEEE, pp. 1-9.

Grasso et.al.; "Supporting Informal Communication Across Local- and Distributed Communities," Xerox Research Centre Europe, Grenoble, France, 8 pages.

Greenberg, et al., "Sharing Fisheye Views in Relaxed-WYSIWIS Groupware Applications" Proceedings of Graphics Interface, Toronto, Canada, May 22-24,1995, Distributed by Morgan-Kaufmann, pp. 28-38, http://www.cpsu.ucalgary.ca/grouplab/papers/1996/96- Fisheye.GI/gi96fisheye.html.

Greenberg, Saul, "A Fisheye Text Editor For Relaxed-WYSIWIS Groupware," ACM SIGCHI96 Conference on Human Factors in Computing System, Companion Proceedings, 1996, pp. 212-213.

Gross, R. et al., "Face Recognition in a Meeting Room," IEEE International Conference on Automatic Face and Gesture Recognition, 294-299.

Gross, R. et al., "Towards a Multimodal Meeting Record," Proceedings of International Conference on Multimedia and Expo, 1593-1596.

Hauptmann et al., "Story Segmentation and Detection of Commercials in Broadcast New Video," Advances in Digital Libraries Conference, Santa Barbara, CA Apr. 22-23, 1998.

Hauptmann et al., "Text, Speech and Vision for Video Segmentation: the Informedia Project," Proc. AAAI Fall Symp. Computational Models for Integrating Language and Vision, Boston, MA, Nov. 10-12, 1995.

He et al., "Comparing Presentation Summaries: Slides vs. Reading vs. Listening," Conference on Human Factors in Computing Systems (CHI 2000), Apr. 1-6, 2000.

Hearst et al., "TileBars: Visualization of Term Distribution Information in Full Text Information Access," Proceedings of the ACM SIGCHI Conference on Human Factors in Computing Systems (CHI), Denver, CO., pp. 1-8, May 1995, http//www.acm.org/sigchi/chi95/Electronic/documents/papers/mah_bdy.htm.

Hecht, "Embedded Data Glyph Technology for Hardcopy Digital Documents," Proc. SPIE 2171:341-352,1994.

Hecht, "Printed Embedded Data Graphical User Interfaces," IEEE Computer, Mar. 2001.

Hill et al., "Edit Wear and Read Wear," Computer Graphics and Interactive Media Research Group, pp. 3-9, May 1992.

Hoadley, C., "A Very Short Introduction to UNIX," The Metropolitan State College of Denver/Information Technology Center for Technology Services, Apr. 30, 2002, pp. 1-18.

Hsu, R.L., et al:, "Face Detection in Color Images," Proc. International Conference on Image Processing, 1046-1049, 2001.

Hu et al., "Multimedia Description Framework (MDF) for Content Descriptions of Audio/Video Documents," Fourth ACM Conference on Digital Libraries (DL 99), Aug. 11-14, 1999.

IBM Technical Disclosure Bulletin, "Quick Selection of Window Environment Coordinates," 35:57-60, ISS # 4B, 1992.

Ioffe et al.; "Finding People by Sampling," Proc. International Conference on Computer Vision, pp. 1092-1097, 1999.

Jang et al., "Improving Acoustic Models With Captioned Multimedia Speech," IEEE, 1999, pp. 767-771.

Jin et al., Topic Tracking for Radio, TV Broadcast, and Newswire, Proceedings of the DARPA Broadcast News Workshop, Feb. 28-Mar. 3, 1999, Herndon, VA.

Johnson, S.E., "Who Spoke When?—Automatic Segmentation and Clustering for Determining Speaker Turns," Proc. Of Eurospeech, 679-682, 1999.

Kapralos, B. et al., "Eyes n Ears Face Detection," 2001 International Conference on Image Processing, 1:65-69, 2001.

Khare, R., "Anatomy Of A URL (and Other Internet-Scale Namespaces, Part 1)," IEEE Internet Computing, Sep.-Oct. 1999, pp. 78-81.

Kimber, D. et al., "Acoustic Segmentation for Audio Browsers," Proc. Interface Conference, Sydney, Australia, 10 pages, 1996.

Komlodi et al., "Key Frame Preview Techniques for Video Browsing," Proceedings of the 3rd ACM International Conference on Digital Libraries, Jun. 23-26, 1998, Pittsburgh, pp. 118-125, 1998.

Lam et al., "Automatic Document Classification Based on Probabilistic Reasoning: Model and Performance Analysis," IEEE, 3:2719-2723,1997.

Langley, P., "An Analysis of Bayesian Classifiers," Proceedings of 10th National Conference on Artificial Intelligence, pp. 223-228,. 1992.

Langley, P., Induction of Selective Bayesian Classifiers; Proceedings of 10th National Conference on Uncertainty in Artificial Intelligence, pp. 400-406,1994.

Lee, D. et al., "Segmenting People in Meeting Videos Using Mixture Background and Object_Models," Proc. of Pacific Rim Conference on Multimedia Taiwan Dec. 16-18, 8-pages, 2002.

Li et al., "Automatic Text Detection and Tracking in Digital Video," IEEE Transactions on Image Processing—Special Issue on Image and Video Processing for Digital Libraries, 9:147-156, 2000.

Li et al., "Text Extraction and Recognition in Digital Video," Proceedings of Third IAPR Workshop on Document Analysis Systems, pp. 119-128, 1998.

Li et al., "VISION: A Digital Video Library," Proceedings of the 1st ACM International Conference on Digital Libraries, pp. 19-27, 1996.

Li et al:, "Text Extraction, Enhancement and OCR in Digital Video," DAS 98, LNCS 1655, pp. 363-377, Springer-Verlag Berlin Heidelberg 1999.

Liang et al., Practical Video Indexing and Retrieval System: SPIE 3240:294-303, 1988.

Lienhart et al., "On the Detection and Recognition of Television Commercials," Proc. IEEE Conf. On Multimedia Computing and Systems, Ottawa, Canada, pp. 509-516, Jun. 1997.

Ma et al., "An Indexing and Browsing System for Home Video," Invited paper, EUSIPCO 2000, 10th European Signal Processing Conference, Sep. 5-8, 2000; Tampere, Finland.

Manber, U., "The Use of Customized Emphasis in Text Visualization," Proceedings of 1997 IEEE Conf. On Information Visualization, pp. 132-138, Aug. 27-29, 1997, London, England.

Maybury et al., "Multimedia Summaries of Broadcast News," International Conference on Intelligent Information Systems, 1997, pp. 442-449.

Maybury, "News on Demand," Communications of the ACM, 43:33-34, 2000.

Maybury, M. et al., "Segmentation, Content Extraction and Visualization of Broadcast News Video Using Multistream Analysis," AAAI Paper, 1997.

Merialdo et al., "Automatic Construction of Personalized TV News Programs," Seventh ACM International Multimedia Conference, Orlando, Nov. 1999.

Merlino et al., "Broadcast News Navigation Using Story Segmentation," Advanced Information Systems Center, The MITRE Corporation, 1997.

Merlino et al., "Broadcast News Processing Techniques," MITRE Technical Report, MTR 99B0000031,Apr. 1999.

Mohan, "Text-Based Search of TV News Stories," Proc. SPIE 2916:2-13, 1996.

Myers et al., "Facsimile with Encrypted hard Copy," IBM Technical Disclosure Bulletin, TDB 04-78, pp. 4994-4995, Apr. 1, 1978, downloaded from www.ip.com/pubview/IPCOM000069447D, pp. 1 and 2.

Myers, B.A. et al., "Multi-View Intelligent Editor for Digital Video Libraries," First AGM and IEEE Joint Conference on Digital Libraries pp. 106-115, Jun. 24-28, 2001, Roanoke, VA.

Oh et al., "Efficient and Cost-Effective Techniques for Browsing and Indexing Large Video Databases," SIGMOD Conference 2000: 415-426.

Pfau, T. et al., "Multispeaker Speech Activity Detection for the ICSI Meeting Recorder," Proc. IEEE Automatic Speech Recognition and Understanding Workshop, 4 Pages, 2001.

Pingali, G. et al., "Multimedia Retrieval Through Spatio-Temporal Activity Maps," ACM Multimedia 129-136, 2001.

Rist, T. et al, "Adding Animated Presentation Agents to the Interface," ACM International Conference on Intelligent User Interfaces, pp. 79-86, 1997.

Rowley et al., "Neural Network-Based Face Detection," IEEE Transactions on Pattern Analysis and Machine Intelligence, 20:23-38, 1998.

Rui, Y. et al., "Viewing Meetings Captured by an Omni-Directional Camera," ACM SIGCHI 01, vol. 3, No. 1, pp. 450-457, Seattle, Mar. 31-Apr. 4, 2001.

Schweighofer et al., "The Automatic Generation of Hypertext Links in Legal Documents," Lecture Notes in Computer Science, vol. 1134, Wagner et al., eds., from 7th Int. Conf., DEXA 96, Sep. 1996, Zurich, Switzerland.

Shahraray et al., "Automated Authoring of Hypermedia Documents of Video Programs," ACM Multimedia 95, San Francisco, CA, Nov. 5-9, 1995.

Shahraray et al., "Automatic Generation of Pictorial Transcripts of Video Programs" Proceedings of the SPIE—Int. Soc. Opt. Eng. 2417:512-518,1995.

Shahraray et al., "Pictorial Transcripts: Multimedia Processing Applied to Digital Library Creation," 1997 IEEE First Workshop on Multimedia Signal Processing, pp. 581-586, 1997.

Shen, H. et al. "Access Control For Collaborative Environments," CSCW 92 Proceedings, Nov. 1992, pp. 51-58.

Sloman. M., "Policy Driven Management For Distributed Systems," To be published in Journal of Network and Systems Management, Plenum Press, 1994. vol. 2, No. 4.

Smith et al., "Video Skimming and Characterization Through the Combination of Image and Language Understanding," Computer Vision and Pattern Recognition IEEE 1997.

Snowdon et al., "Diffusing Information in Organizational Settings: Learning from Experience," CHI 2002, vol. No. 4, Issue No. 1, Apr. 20-25, Minneapolis, Minnesota, pp. 331-338.

Sodergard et al., "Integrated Multimedia Publishing—Combining TV and Newspaper Content on Personal Channels," downloaded from http:www8.org/w8-papers/1 b- multimedia/integrated/integrated.html on Apr. 4, 2002, pp. 1-22.

Sonmez et el., "Multiple Speaker Tracking and Detection: Handset Normalization and Duration Scoring," Digital Signal Processing 10:133-143, 2000.

Stauffer, C. et al., "Adaptive Background Mixture Models for Real-Time Tracking," Proceedings of Computer Vision and Pattern Recognition, 246-252.

Suda et al., "Logo and Word Matching Using a General Approach to Signal Registration," Fourth International Conference on Document Analysis and Recognition, Ulm, Germany, Aug. 18-20, 1997, 61-65.

Sumita et al., "Document Structure Extraction for Interactive Document Retrieval Systems," Proceedings of SIGDOC 93, pp. 301-310, Oct. 5-8, 1993, Kitchner, Ontario.

Sun et al., "A Motion Activity Descriptor and its Extraction in Compressed Domain," Proc. IEEE Pacific-Rim Conference on Multimedia (PCM 01), 4 Pages, 2001.

Sun et al., "Panoramic Video Capturing and Compressed Domain Virtual Camera Control," ACM Multimedia, pp. 329-338, 2001.

Taghva et al., "Evaluation of an Automatic Markup System," Proceedings SPIE vol. 2422, Document Recognition II, p. 317-327, Mar. 1995.

Taghva et at, "An Evaluation Of An Automatic. Markup System," SPIE Proceedings, Feb. 6-7, 1995, pp. 317-327, vol. 2422.

Taxt, T., "Segmentation of Document Images," IEEE, 11(12):1322-1329 (1989).

Tennenhouse et al., "A Software-Oriented Approach to the Design of Media Processing Environments," Proceedings of the IEEE International Conference on Multimedia Computing and Systems, pp. 435-444,1994.

Tonomura et al., VideoMAP and VideoSpacelcon: Tools for Anatomizing Video Content, Proc. INTERCHI 93, ACM, pp. 131-136, 1993.

Tritschler, A. et at, "Improved Speaker Segmentation and Segments Clustering Using the Bayesian Information Criterion," Proc. Of Eurospeech, pp. 679-682, 1999.

Uchihashi et al., "Summarizing Video Using a Shot Importance Measure and a Frame-Packing Algorithm," Proceedings of the International Conference on Acoustics; Speech, and Signal Processing, Phoenix, AZ, 6:3041-3044,1999.

Uchihashi et al., "Video Manga: Generating Semantically Meaningful Video Summaries," ACM Multimedia 99, Orlando. Florida, Oct. 30-Nov. 5, 1989.

VideoLogger, Automate Video Acquisition And Production, Virage, Inc., [online] [Retrieved on Apr. 26, 2002] Retrieved from the internet<URL:http://www.virage.com/products/details. cfm?productID=5&categoryID=1>.

Wactlar et al., "Complementary Video and Audio Analysis for Broadcast News Archives," Communications of the ACM, 43:42-47, 2000.

Wactler et al., "Intelligent Access to Digital Video: Informedia Project," Computer 29:46-52, 1996.

Waibel, A. et al., "Advances in Automatic Meeting Record Creation and Access," Proceedings of the International Conference on Acoustics, Speech, and Signal Processing, pp. 597-600, 2001.

Weiss et al., "Composition and Search with a Video Algebra,"IEEE Multimedia 2:12-25, 1995.

Wilcox, L. et al., "Annotation and Segmentation for Multimedia Indexing and Retrieval," Proceedings of the Thirty-First annual Hawaii International Conference on System Sciences (Wailea, Hawaii), vol. 11, pp. 259-267, Jan. 1998.

Wittenburg et al., Browsing with Dynamic Key Frame Collages in Web-Based Entertainment Video Services, In Proceedings of IEEE International Conference on Multimedia Computing and Systems, Jun. 7-11, 1999, Florence, Italy, 2:913-918,1999.

Yang, J. et al., "Multimodal People ID for a Multimedia Meeting Browser," Proceedings of ACM Multimedia, pp. 159-168, 1999.

Yang, M.H. et al., "Detecting Faces in Image: A Survey," IEEE Transactions on Pattern Analysis and Machine Intelligence, 24(1);34-58, 2002.

Zhang et al., Detection of Text Captions in Compressed Domain Video, International Multimedia Conference Proceedings of the 2000 ACM Workshops on Multimedia 2000, Los Angeles, CA, pp. 201-204.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.

European Search Report, EP 04255837, Sep. 5, 2006, 3 pages.

European Search Report, EP 04255839, Sep. 4, 2006, 3 pages.

European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Lamming et al., "Using Automatically Generated Descriptions of Human Activity to Index Multi-media Data," IEEE Multimedia Communications and Applications IEE Colloquium, Feb. 7, 1991, pp. 5/1-5/3.

"Microsoft Powerpoint—Wikipedia, the free encyclopedia," Wikimedia Foundation, Inc., [online] [Retrieved on Nov. 7, 2006] Retrieved from the Internet<URL:http://en.wikipedia.org/wiki/Microsoft_PowerPoint>.

Minami, K. et al., "Video Handling with Music and Speech Detection," IEEE Multimedia, Jul.-Sep. 1998, pp. 17-25.

Dimitrova, et al., "Applications of Video-Content Analysis and Retrieval," IEEE Multimedia, Jul.-Sep. 2002, pp. 42-55.

European Search Report for European Application No. 04255836 mailed on Sep. 12, 2006, 3 pages.

European Search Report for European Application No. 04255837 mailed on Sep. 5, 2006, 3 pages.

European Search Report for European Application No. 04255839 mailed on Sep. 4, 2006, 3 pages.

European Search Report for European Application No. 04255840 mailed on Sep. 12, 2006, 3 pages.

Graham, et al., "A Paper-Based Interface for Video Browsing and Retrieval," ICME '03, Jul. 6-9, 2003, pp. 749-752, vol. 2.

Graham, et al., "Video Paper: A Paper-Based Interface for Skimming and Watching Video," ICCE '02, Jun. 18-20, 2002, pp. 214-215.

Greenberg, S., "A Fisheye Text Editor for Relaxed-WYSIWIS Groupware," ACM SIGCHI'96 Conference on Human Factors in Computing System, Companion Proceedings, 1996, 5 pages.

Greenberg, et al., "Sharing Fisheye Views in Relaxed-WYSIWIS Groupware Applications," Proceedings of Graphics Interface, Toronto, Canada, May 22-24, 1995, Distributed by Morgan-Kaufmann, pp. 28-38, at URL:http://www.cpsu.ucalgary.ca/grouplab/papers/1996/96-Fishe.

Klemmer, et al., "Books with Voices: Paper Transcripts as a Tangible Interface to Oral Histories," CHI Letters, Apr. 5-10, 2003, pp. 89-96, vol. 5, issue 1.

Lamming et al., "Using Automatically Generated Descriptions of Human Activity to Index Multi-Media Data," IEEE Multimedia Communications and Applications IEEE Colloquium, Feb. 7, 1991, pp. 3.

Langley, P., "An Analysis of Bayesian Classifiers," Proceedings of 10th National Conference on Artificial Intelligence, 1992, pp. 223-228.

Lutz, Raymond, "BrowseFax Initiative," MPFA Information Site, printed on May 14, 2004, 11 pages, at URL: http://www.mtpa.org/pub/browsefax_wp.htm.

Ma et al., "An Indexing and Browsing System for Home Video," Invited paper, EUSIPCO '2000, 10th European Signal Processing Conference, Sep. 5-8, 2000, 6 pages, Tampere, Finland.

Notice of Allowance for U.S. Appl. No. 10/404,916, mailed on Aug. 17, 2009, 9 pages.

Non-Final Office Action for U.S. Appl. No. 10/894,653, mailed on Apr. 14, 2006, 49 pages.

Non-Final Office Action for U.S. Appl. No. 10/894,653, mailed on Jan. 25, 2007, 27 pages.

Final Office Action for U.S. Appl. No. 10/894,653, mailed on Jul. 16, 2007, 15 pages.

Advisory Action for U.S. Appl. No. 10/894,653, mailed on Sep. 25, 2007, 4 pages.

Non-Final Office Action for U.S. Appl. No. 10/894,653, mailed on Dec. 28, 207, 19 pages.

Final Office Action for U.S. Appl. No. 10/894,653, mailed on Aug. 8, 2008, 17 pages.

Notice of Allowance for U.S. Appl. No. 10/894,653, mailed on Dec. 31, 2008, 17 pages.

Non-Final Office Action for U.S. Appl. No. 10/665,097, mailed Apr. 12, 2006, 76 pages.

Final Office Action for U.S. Appl. No. 10/665,097, mailed on Oct. 5, 2006, 32 pages.

Non-Final Office Action for U.S. Appl. No. 10/665,097, mailed on Mar. 21, 2007, 31 pages.

Final Office Action for U.S. Appl. No. 10/665,097, mailed on Sep. 18, 2007, 30 pages.

Non-Final Office Action for U.S. Appl. No. 10/665,097, mailed on Jan. 25, 2008, 31 pages.

Final Office Action for U.S. Appl. No. 10/665,097, mailed on Jul. 24, 2008, 30 pages.

Notice of Allowance for U.S. Appl. No. 10/665,097, mailed on Feb. 25, 2009, 9 pages.

Non-Final Office Action for U.S. Appl. No. 10/687,019, mailed on Mar. 30, 2006, 72 pages.

Final Office Action for U.S. Appl. No. 10/687,019, mailed on Aug. 23, 2006, 84 pages.

Non-Final Office Action for U.S. Appl. No. 10/687,019, mailed on Feb. 7, 2007, 49 pages.

Final Office Action for U.S. Appl. No. 10/687,019, mailed on Sep. 11, 2007, 54 pages.

Non-Final Office Action for U.S. Appl. No. 10/687,019, mailed on Jan. 25, 2008, 57 pages.

Final Office Action for U.S. Appl. No. 10/687,019, mailed on Aug. 7, 2008, 46 pages.

Non-Final Office Action for U.S. Appl. No. 10/687,019, mailed on Dec. 15, 2008, 36 pages.

Non-Final Office Action for U.S. Appl. No. 10/687,019, mailed on Jun. 29, 2009, 36 pages.

Non-Final Office for U.S. Appl. No. 10/404,916. mailed Mar. 31, 2006, 30 pages.

Final Office Action for U.S. Appl. No. 10/404,916, mailed Dec. 22, 2006, 47 pages.

Non-Final Office Action for U.S. Appl. No. 10/404,916, mailed Jul. 16, 2007, 21 pages.

Final Office Action for U.S. Appl. No. 10/404,916, mailed Jan. 23, 2009, 23 pages.

Advisory Action for U.S. Appl. No. 10/404,916, mailed Mar. 24, 2009, 5 pages.

Final Office Action for U.S. Appl. No. 10/639,282, mailed on May 14, 2009, 37 pages.

Non-Final Office Action for U.S. Appl. No. 10/639,282, mailed on Apr. 12, 2006, 38 pages.

Final Office Action for U.S. Appl. No. 10/639,282, mailed on Oct. 5, 2006, 37 pages.

Non-Final Office Action for U.S. Appl. No. 10/639,282, mailed on Oct. 25, 2007, 37 pages.

Final Office Action for U.S. Appl. No. 10/639,282, mailed on Apr. 17, 2008, 38 pages.

Final Office Action for U.S. Appl. No. 10/639,282, mailed on Nov. 17, 2008, 35 pages.

Final Office Action for U.S. Appl. No. 10/687,019, mailed on Jan. 25, 2010, 20 pages.

Notice of Allowance for U.S. Appl. No. 10/404,916, mailed on Jan. 11, 2010, 12 pages.

* cited by examiner

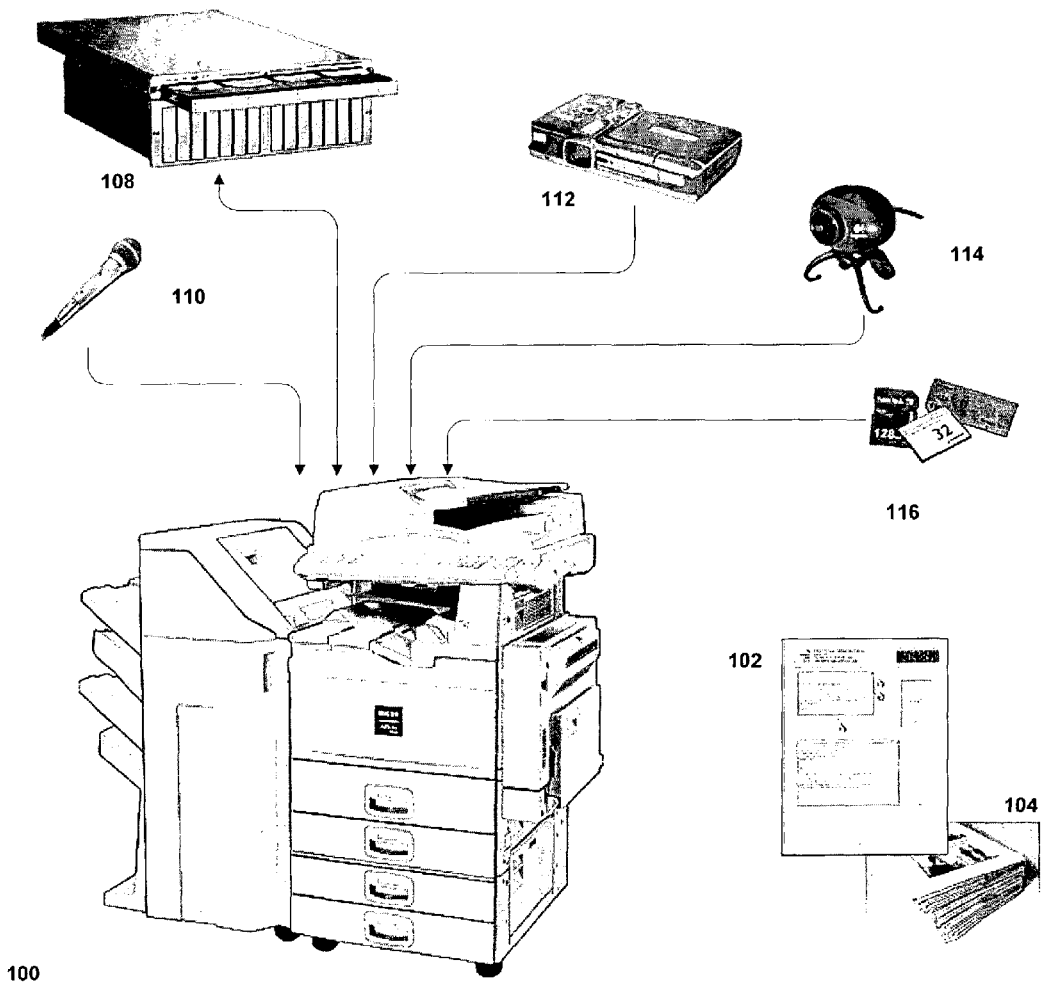
Figure 1 A
Figure 1 C
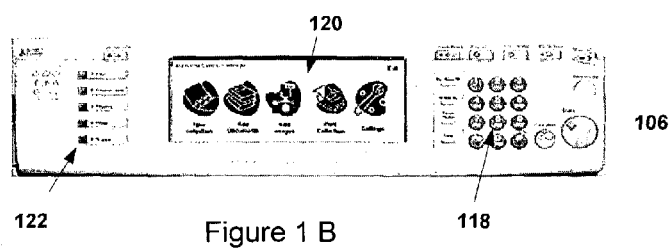
Figure 1 B 3 regions shown. Each of three people have different collection IDs where two of the three regions are read-only and the third is read-write.

Collection Permissions (alternative approach)

MULTIMEDIA DOCUMENT SHARING METHOD AND APPARATUS

CROSS-REFERENCES TO RELATED APPLICATIONS

This application is related to the following commonly owned and co-pending U.S. patent applications which are hereby incorporated by reference for all purposes:

U.S. patent application Ser. No. 10/404,916 titled "Method and Apparatus for Composing Multimedia Documents," concurrently filed;

U.S. patent application Ser. No. 09/521,252 titled "Method and System for Information Management to Facilitate the Exchange of Ideas During a Collaborative Effort," filed Mar. 8, 2000, now U.S. Pat. No. 7,299,405;

U.S. application Ser. No. 10/001,895 titled "Paper-Based Interface For Multimedia Information," filed Nov. 19, 2001, now U.S. Pat. No. 7,263,659;

U.S. patent application Ser. No. 10/081,129 titled "Multimedia Visualization & Integration Environment," filed Feb. 21, 2002;

U.S. application Ser. No. 10/085,569 titled "A Document Distribution and Storage System", filed Feb. 26, 2002, now U.S. Pat. No. 7,451,236;

U.S. patent application Ser. No. 10/174,522 titled "Television-based Visualization and Navigation Interface," filed Jun. 17, 2002;

U.S. application Ser. No. 10/175,540 titled "Device For Generating A Multimedia Paper Document," filed Jun. 18, 2002, now U.S. Pat. No. 7,215,436; and U.S. application Ser. No. 10/307,235 titled "Multimodal Access of Meeting Recordings," filed Nov. 29, 2002, now U.S. Pat. No. 7,298,930.

BACKGROUND OF THE INVENTION

The present invention relates generally to document management and more specifically to access and dissemination of collections of multimedia documents.

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. The computer promotes individual expression through the use of graphics tools, image capture devices, image enhancement tools, and so on, in addition to traditional text editing. Oftentimes, documents must be shared among colleagues, thus generating even more paper.

Despite advances in technology, suitable personal output devices as a practical substitute for paper remains to be developed. Personal data assistants (PDAs such as Palm Pilot® by 3 Comm, Inc., and similar hand held devices) typically do not have the storage capacity, the processing capacity, the display capacity, or the connectivity to effectively present documents to the user in a convenient and useful manner. Unlike paper, devices such as PDAs are not universal. While many document formats exist for representing information, not all devices have all the software needed to read all documents. Worse yet, PDA documents typically use formats that are not readily available on a desktop or laptop PC. Usually, documents have to be converted between formats. Paper remains the simplest way in many situations for storing information (e.g., record keeping), distributing information, and controlling access to information.

Paper has been an integral component of civilization for thousands of years. Its replacement is not likely to occur soon, if ever, despite the ubiquity of computer-based technology. Electronic information almost invariably is reduced, at least in part, to paper. Perhaps then, the role of the computer is not to achieve a paperless society. Instead, the role of the computer may be as a tool to reduce the amount of paperwork; i.e., to achieve a "less paper" environment rather than a paperless environment. Generally, there is a need to use computers to more effectively share information and to provide access to that information. In addition, the information should not be limited to any particular mode of expression, allowing for all forms of communication media.

SUMMARY OF THE INVENTION

Various aspects of the present invention facilitate sharing of multimedia documents amongst users. In accordance with aspects of the invention, documents can be organized into one or more collections. Information can be added to the collection, thus creating different layers (versions) of collections. A collection overview representative of the collection can be printed on a suitable medium, such as paper for example. This collection "coversheet" can provide access to the collection. In this way, documents in the collection can be shared by distributing copies of the coversheet to recipients.

According to other aspects of the invention, a collection coversheet can be used to browse a collection and to direct actions on elements in the collection. Annotative information can be used to facilitate navigation of the collection. Annotative information can be use to specify actions to be performed on elements in the collection.

BRIEF DESCRIPTION OF THE DRAWINGS

An understanding of the present invention is provided by the following figures along with the discussion that follows, where:

FIG. 1A is a pictorial representation showing an overview of an illustrative embodiment of various aspects of the present invention;

FIG. 1B is a pictorial representation of the control panel and display of the multi-function scanner/printer shown in FIG. 1A;

FIG. 1C is a pictorial representation of a coversheet and a stack of papers used in the present invention;

DESCRIPTION OF THE SPECIFIC EMBODIMENTS

Collections of paper documents are used for many purposes. Many people keep folders of documents on their desks or in their file system which are related to a particular task or to a particular person. A law firm keeps a "docket" of papers for a specific case or client. A medical office keeps at least one file of papers for each patient who uses that office. It is important to keep those papers together to facilitate work tasks related to those papers. For instance, in a medical office, if a doctor wishes to review a patient's medical history, she can flip through that patient's folder and look at what tests have been performed or what illnesses the patient has suffered in the past.

The terms "paper", "paper medium", or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

Information is increasingly being captured and kept in electronic form as well. For instance, even though a picture taken with a digital camera can be printed, it originated electronically and could be stored electronically as well. Digital files are easier to copy and move around than paper in many cases. Both paper and electronic media have distinct advantages.

Until now, paper has had to forgo the advantages of electronic media. With the advent of programmable MFPs or multi-function peripherals, it is much easier to convert paper into electronic form. It is now possible to set up an MFP to acquire pages of a document and convert them into electronic form and store those documents in collections.

Collections in this specification have a specific meaning. A "collection" can include one or more groups of electronic documents or media which might include digital images, audio recordings, scanned images from pages of a document, files like a Microsoft Word documents or Microsoft Excel spreadsheets. Collections can also contain pointers to other collections. Collections can include user-provided markings, annotations, and such. Collections can also include metadata representing related information such as date of creation, modification date, access permissions, and so on.

A collection is stored on a collection server and has a specific address or identifier, similar to a URL or uniform resource locater, which identifier is unique and provides a pointer to the collection. A collection has a coversheet which displays a representation of the contents of the collection with an overview image showing thumbnails which represent all of the documents in the collection. More details about collections will be described in another part of this specification.

Figure 2:
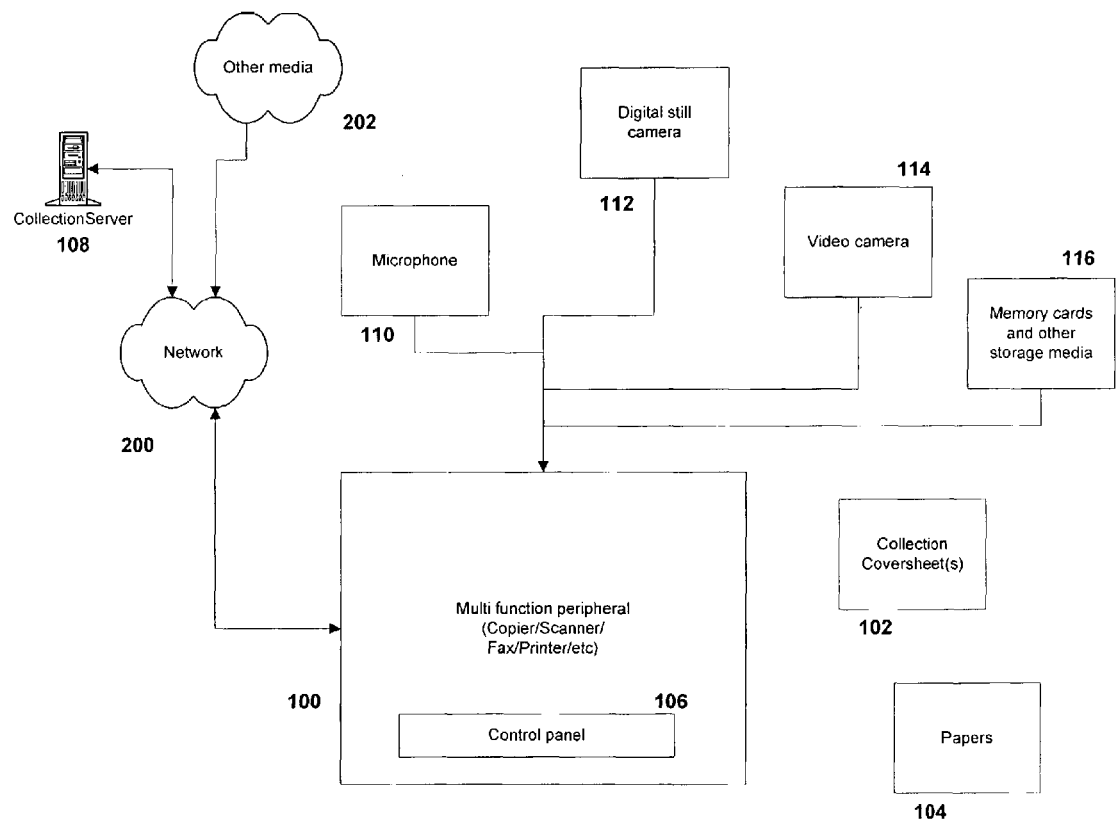
FIG. 2 is a block diagram showing the elements of an illustrative embodiment of various aspects of the present invention.

The system exemplar shown in FIG. 1 is a pictorial representation of an illustrative embodiment showing the various components that are part of the present invention. A corresponding block diagram is given in FIG. 2, showing various functional components. Multiple data capture device examples are shown to illustrate the data capture functionality of the present invention. In a particular embodiment, a multi-function peripheral (MFP) 100 is provided for scanning documents 102 and 104 and to serve as a source of electronic information. Additional capture devices are provided, including but not limited to microphones 110, digital cameras 112, video cameras 114, memory cards and other removable media 116 as well as additional devices connected to the network that may not be near or in the same room with the MFP 100. The MFP 100 is connected through a network 200 to a collection server 108 which allows the MFP to create, store, and modify collections of media that will be described in more detail later in this specification.

Each MFP 100 has a control panel 106 which provides methods of controlling the MFP 100 through various means including but not limited to keypads 118, buttons and touchscreen displays 120. The control panel 106 also provides feedback to the user through the display 120 and indicator lights 122. The feedback might indicate the current state of the MFP or might indicate the task being completed by the MFP.

Also shown in FIG. 1 are documents 104 and a special document 102 called a collection coversheet. A collection coversheet 102 can be used with the MFP to carry out the methods of the present invention.

The MFP 100 includes the capability of scanning single or multiple pages in sequence and storing those internally or performing imaging operations on those pages. The MFP 100 also has the ability to print images either from its internal storage 316 or from memory 318 or from other capture devices. Other captures devices, including but not limited to a microphone 110, a digital camera 112, a video camera 114 or other devices can be provided to record media such as audio or activity such as a meeting, surveillance activity, and so on.

Figure 3:
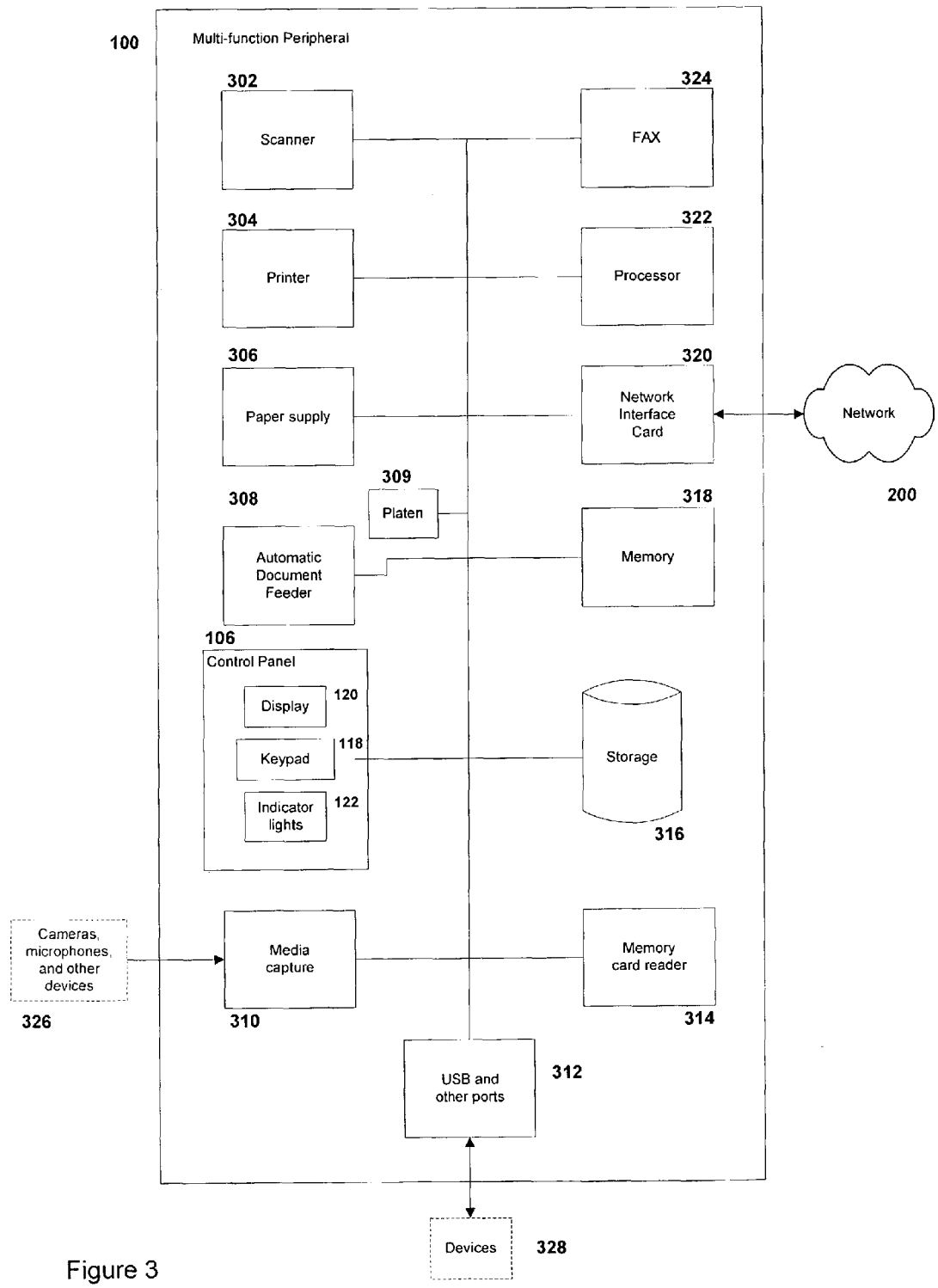
FIG. 3 shows a block diagram of an embodiment of a multi-function peripheral in accordance with an embodiment of the present invention.

FIG. 3 is an illustrative example of a device embodying various aspects of the present invention. A typical multi-function peripheral (MFP) 100 is made up of various components that are shown in FIG. 3, some of which are not required in the operation of this invention. The MFP 100 has a scanner 302 which can image pages of a document and in conjunction with the automatic document feeder 308 can image multiple pages rapidly. Images of pages can be stored in a non-volatile storage area 316 which might be a disk drive or in any other memory storage area like the memory 318. The MFP 100 also contains a printer mechanism 304 which can retrieve paper from the paper supply 306 and print images which are stored in the memory 318, storage 316, obtained directly from the scanner 302, obtained from the processor 322 or from the network interface card 320 which can receive image print requests and images from the external network 200. Images to be printed can also come from the memory card reader 314, media capture devices 326 and 328 through a media capture port 310 or a USB or other port 312. Images can also be received or sent out through the fax interface 324.

The MFP can access other forms of media through electronic data input peripherals which may include magnetic media readers for magnetic media such as floppy disks, magnetic tape, fixed hard disks, removable hard disks, memory cards, and so on. Peripherals may also include optical media readers for optical storage media such as CDs, DVDs, magneto-optical disks, and the like. Information obtained from these peripherals can be incorporated or otherwise associated with scanned-in documents to enhance the document content.

The processor 322 controls the operation of the MFP components shown in FIG. 3. The control panel 106 can be used to instruct the processor 322 to use the components of the MFP 100 to make copies, scan documents or print faxes. MFPs are available from many companies, including Ricoh Company Ltd in Tokyo, Japan which makes a programmable MFP called the Aficio 1045 which contains many of the components shown in FIG. 3. Any suitably equipped MFP could be used in practicing this invention.

The memory 318 of the MFP contains modules which allow the operation of the MFP as well as the practice of the present invention.

Figure 4:
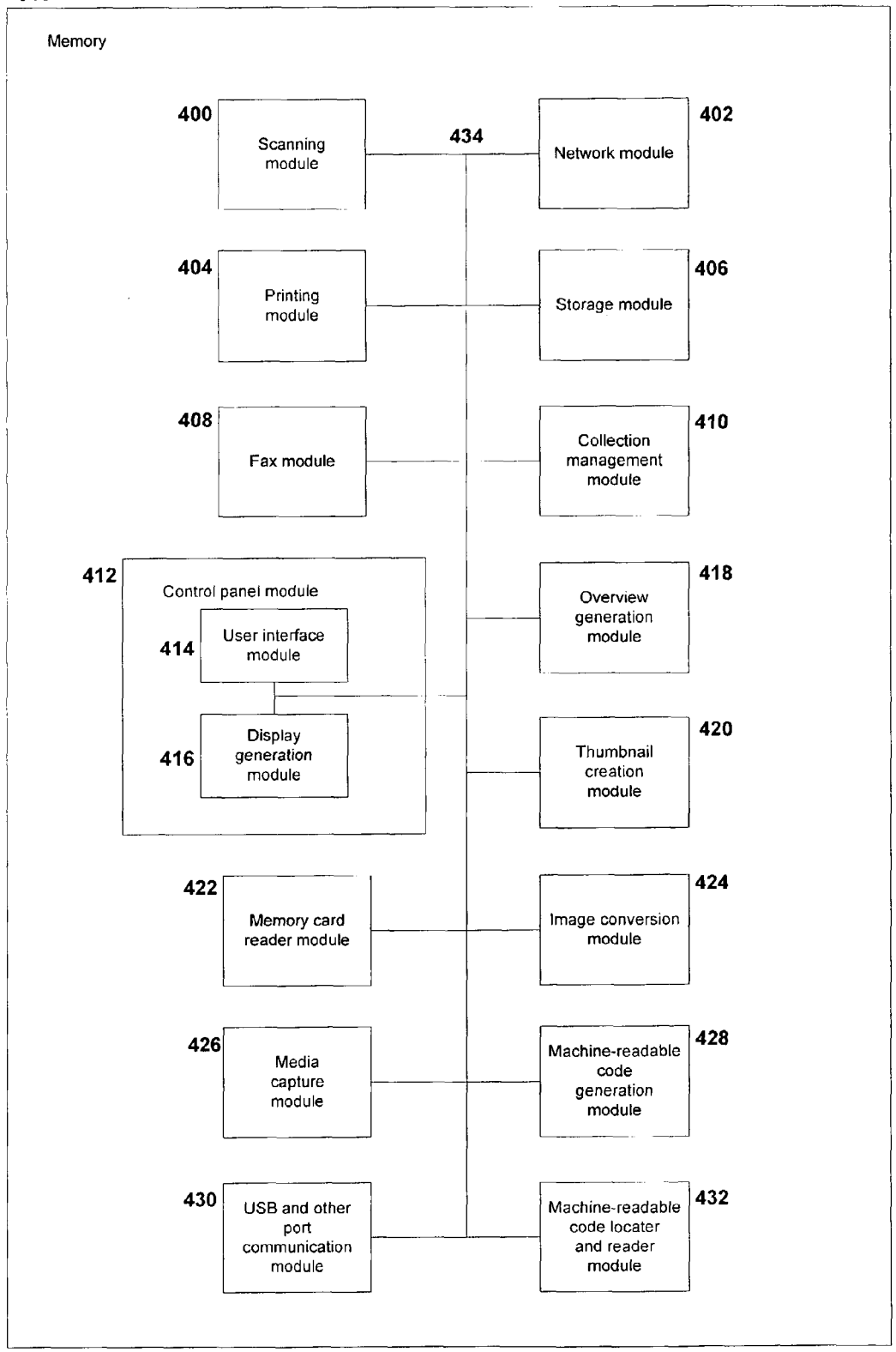
FIG. 4 is a block diagram of an embodiment of the memory of the multi-function peripheral in accordance with an embodiment of the present invention.

FIG. 4 is a high level representation of various program modules resident in memory 318 for operating the MFP in accordance with the different aspects of the present invention. The scanning module 400 contains the instructions that the processor 322 in combination with the scanner 302 can use to scan pages of documents 104. The printing module 404 contains control instructions for receiving an image or a description of an image and driving the printer 304 causing the image to be printed on a piece of paper. MFPs are known in the art and made by many different companies so a complete description of the operation of the MFP is not necessary. The fax 408, network 402, storage 406, image conversion 424, memory card reader 422, media capture 426, USB and other port 430 modules will not be described because their purpose and function is well understood.

In addition to the typical MFP functions, the following modules are necessary for the operation of this invention. A collection management module 410 must be available which tells the processor how to communicate with the collection server and how to create and modify collections.

A thumbnail creation module 420 can create thumbnail representations of media, including a smaller version of an image, a single-frame from a video or even a waveform from a stored audio signal. These thumbnails are used at least by the overview generation module 410 which is used to create an overview of a collection. The overview is described in detail later and the overview generation module puts together the thumbnails representing the documents and media into a single image that can be displayed or printed and used for accessing the documents and media.

The machine readable code generation module 428 provides the MFP with the ability to create machine-readable codes like barcodes which represent specific collections. The machine-readable code locator/reader module can be used to find and decode machine-readable codes on collection coversheets in order to determine which coversheet was scanned by the scanning mechanism 302. Preferably, machine-readable codes are barcodes, though there are many ways of creating machine-readable indicia. Barcodes are robust and take up little space and are easily decoded using standard hardware and software. On company that sells software for locating and decoding a variety of barcodes is Axtel Applied Technology of Vista California USA. Decoding machine-readable codes is well known in the industry.

The control panel is controlled by the processor 322 using information from the user interface module 414 and the display generation module 416 which are part of the control panel module 412.

The use and operation of each of the hardware components and modules will be clarified during the description of the operation of the invention.

Figure 5:
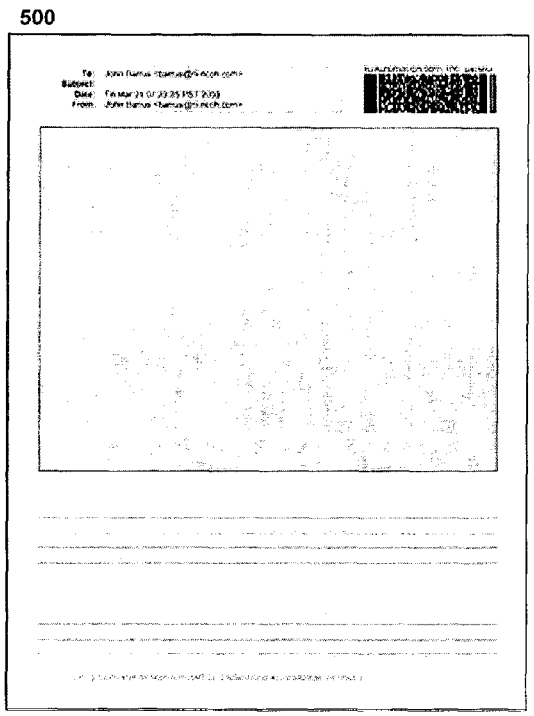
FIG. 5A shows an example of an empty collection coversheet in accordance with an embodiment of an aspect of the present invention.
FIG. 5B shows an example of a non-empty collection coversheet in accordance with an embodiment of an aspect of the present invention.
Figure 5:
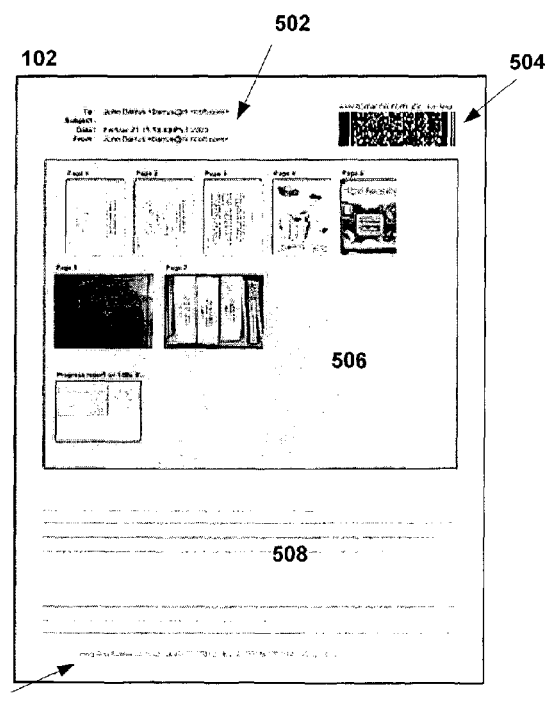

FIG. 5A shows an example collection coversheet 500 from an empty collection. An empty collection contains no media or documents. It is really just a placeholder for storing documents in the future. FIG. 5B shows a collection coversheet 102 with eight documents. Three of those documents are images from a digital camera, four documents are scanned pages from the MFP, and the bottom left document is a pointer to another collection which contains two documents. The collection overview is used as the thumbnail representation of the collection.

A collection coversheet 102 is a paper which represents a collection and is made up of a header 502, a string of text printed in a machine-readable format 504, a collection overview image 506, optionally, an area in which notes may be written 508, and optionally a human-readable version 510 of the text encoded in the machine-readable code 504.

The header 502 contains printed information about the collection, including the author of the collection, a list of zero, one or more people who will be notified if the collection is modified, time and date information about when the collection was last modified or when this coversheet was printed out, and an optional collection topic or subject.

The machine-readable code 504 contains an encoded version of a unique pointer to the collection on the collection server. This same pointer when presented in human-readable form 510 might be similar to a uniform resource locator or URL used in the world wide web and is called a collection identifier, distributed resource identifier, or DRI. The preferred implementation of the collection server uses these "distributed resource identifiers" or DRIs as unique collection pointers. DRIs are globally unique, difficult to guess, and can provide access to collections from anywhere on the internet. The pointer data stored in the barcode or written in human-readable form is the DRI. The barcode is just a machine-readable version of that DRI.

Within this specification the terms "collection identifier", "distributed resource identifier", and "DRI" will be used interchangeably and should be understood to mean the same thing—a unique identifier that points to a collection of media and documents stored on a collection server. In some cases, multiple identifiers point to the exact same collection in order to provide different ways of accessing that collection, but never will one identifier point to multiple collections. Also, the identifier might be written in human-readable form or machine-readable form. Both printed forms represent the same identifier and point to the same collection even though they look unlike each other.

The bar code representation 504 of a DRI allows for automated access to the collection without requiring the user to manually enter the location. It can be appreciated of course that any machine-readable indicium can be used instead of a bar code system, including optical character recognition (OCR) of the human-readable 510 DRI.

A bar code 504 and a corresponding human-readable DRI (distributed resource identifier) 510 are elements of the coversheet which indicate the location of the collection. In a particular embodiment of the invention, a 2-D bar code format is used. The DRI used for a collection points to a directory which contains the collection of documents as well as information used to build the collection overview and some additional metadata. DRIs can also point directly to an individual file the same way that a URL can point to either a directory or a file.

Since a collection typically comprises a multitude of documents, the DRI is often a directory reference rather than a reference to a particular file. For example, in an OS (operating system) such as Unix, the DRI can be a directory reference such as /usr/collection. Alternatively, the DRI can refer to a file which in turn leads to an identification of the constituent elements of a collection. In still another alternative, the DRI can be a reference to a database that stores the collection. It can be appreciated that still other alternatives for storing collections of information may be suitable.

In accordance with an aspect of the invention, the text of the DRI 510 may be made up of a string of characters which includes a random text component. This randomly (and thus, unguessable) generated text serves to prevent access to a collection because it is virtually impossible to guess. Identifying a collection with an identifier that has no correlation to the content of the collection may present a strong impediment to hacking attempts; the hacker simply has no idea where the collection may be located, or that the collection even exists.

The example DRI "/root/usr/collection" assumes a single-machine architecture. In a more generalized configuration of two or more machines, the DRI can include a machine name component. For example, a more accessible format such as the URL (universal resource locator) format for identifying world wide web (WWW) pages might be suitable. In accordance with this particular embodiment of the invention, the DRI constitutes the path portion of the URL. Purely by convention, the path portion uses the following naming format according to a particular embodiment of this aspect of the present invention:

. . ./-DDS-/ORIGIN/. . . , where DDS is the name of a particular repository of collections, and ORIGIN is the fully-qualified hostname of the origin server for the collection identified by the DRI.

Thus, for example, suppose a collection is identified by the following URL:

http://machine1.com/-msg-/machine2.com/2002/1022/398hy9y8h8#$30er#/1/

The IP address of the machine is identified by "machine1.com." The path portion refers to a collection stored in a repository named "-msg-." The original copy of the collection (i.e., its place of creation) is located on a machine named "machine2.com." Thus, in this case, "machine1" contains a copy of the collection. In this particular embodiment of the invention, collections are contained in directories, though other data storage conventions can be used; e.g., collections can be stored and managed in a database. The collection shown in the example above is stored in a directory called:

"/2002/1022/398hy9y8h8#$30er#/1/."

The pathname portion "/2002/1022" represents a date; e.g., date of creation of the collection. The string "398hy9y8h8#$30er#" represents randomly generated text. Finally, as will be discussed below, the directory represented by the terminal pathname "/1/" refers to the first (initial, original, base, etc.) version of the collection.

In this particular embodiment, both the host machine ("machine1") and the origin machine ("machine2") use the following directory structure and URL naming structure. The host machine has a directory called "-msg-" contained in its respective "root" directory for storing collections. The "-msg-" directory has a sub-directory called "machine2.com" which contains all the collections originating on "machine2.com." Generally, a sub-directory is provided for each machine that can be an originator of a collection.

A DRI represents a collection by providing a unique, secure pointer to a directory or to a file within that directory on a collection server. A person or machine given the DRI will have enough information to access the collection in order to add to or modify the collection.

It is possible to modify a collection by adding new documents, creating annotations in the collection overview, changing the position of thumbnails in the overview or removing existing documents. Every time a collection is modified, the terminal pathname in the collection can be incremented so that the original collection with the original DRI is unchanged and the new collection is in a new directory.

This allows a DRI to always point at the same unmodified collection and at the same time, newer versions of the collection are easy to find. In fact, most modem file systems and operating systems allow symbolic links or "aliases" to exist between files so that a single data file can appear to be located in two separate directories. Using such links, different versions of a collection can be built without duplicating any data files because a file that appears in the /1/ and the /2/ version can be linked rather than duplicated.

When a collection server modifies a collection, it is possible to create a new directory like /2/ and then create symbolic links in /2/ that point at files in /1/ without duplicating any files. New files added to this new version of the collection would reside directly in /2/ and files which were in /1/ and are not in /2/ remain without links. The annotations, overview and metadata in /2/ would be modified appropriately. This is well understood in the art.

In the preferred embodiment of the invention, scalable vector graphics files or SVG files are used to represent the collection overview and annotations 506. SVG files are a standard way of creating a visual representation on the World Wide Web and there are many, viewers and tools for creating SVG. A collection preferably includes a specially named SVG file which can be used to construct an overview image 506 for the coversheet 102 or any display.

The SVG file includes information for displaying the thumbnails of individual documents and media stored in the collection. It also keeps track of annotations or sketch marks that are not part of any individual document. For instance, in a collection overview, the creator of the collection might want to indicate an association between two media files or documents by drawing a circle enclosing both files or drawing a line between them. The circle or line is only stored in the collection overview in the SVG file and is not part of either document. Annotations can include circles, sketch marks, transparent highlighting, text labels, or anything supported by the SVG graphics format.

Metadata about the individual files in the collection and their relationship to other files in the collection is stored preferably in an XML (extensible markup language) file. This information typically includes image width and height, links between images and their thumbnails and links between a document and an image representing that document. The exact format is unimportant as long as the collection server understands how to read and write the format.

Additional information related to the collection as a whole can also be stored in the metadata file. This information might include the time at which the message was created, the subject of the message, the name of the author of the collection, and contact information such as email addresses, fax numbers, etc. belonging to those who should be notified when a collection is altered.

Figure 6:
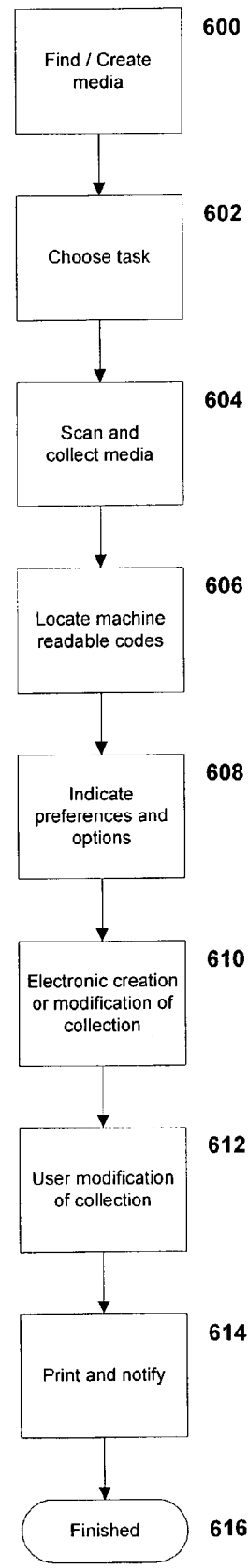
FIG. 6 illustrates schematically the typical steps and flow of information for composing or modifying a collection.
Figure 7:
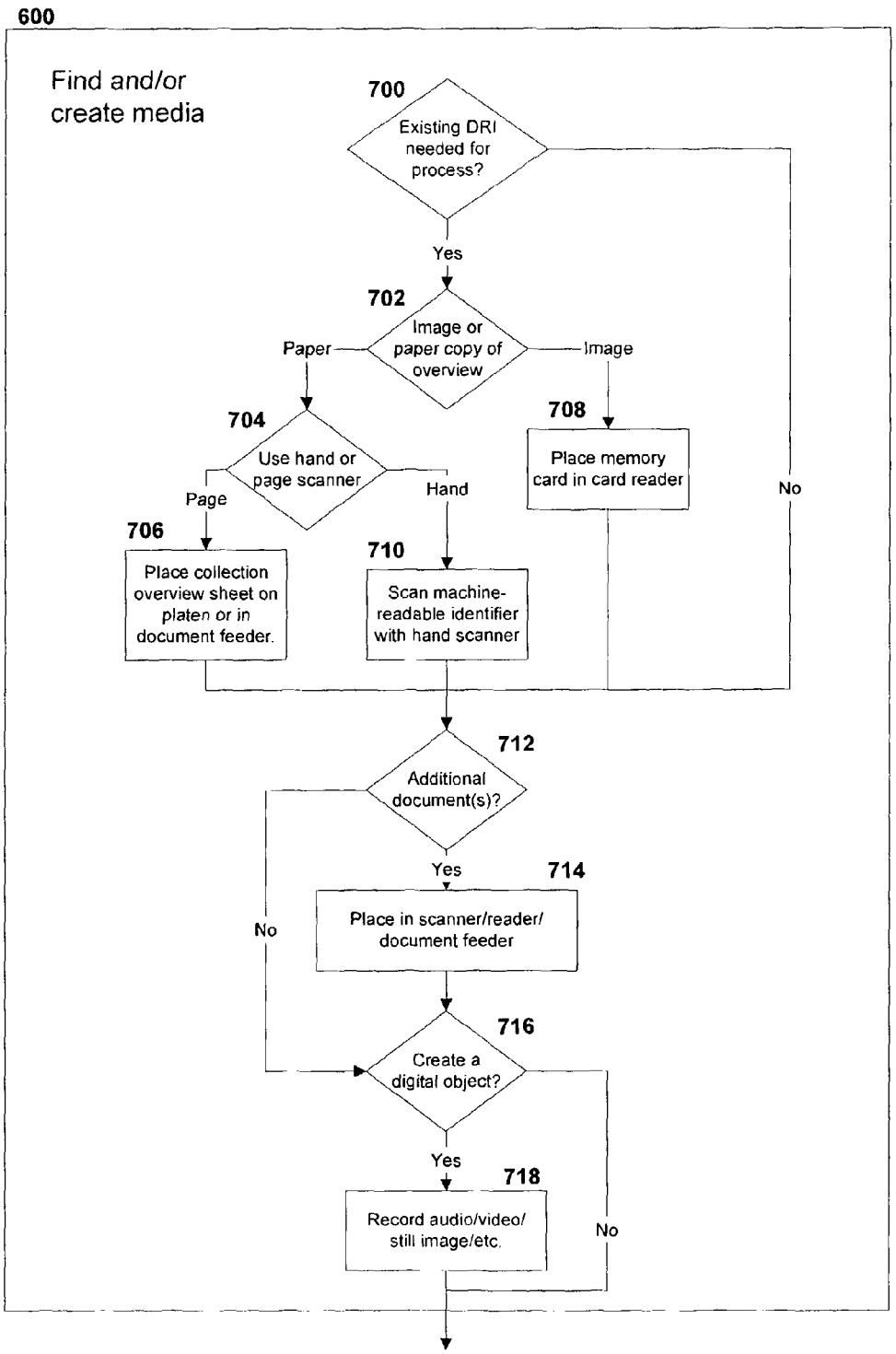
FIG. 7 is a flow diagram, highlighting the steps for finding or creating media for a collection.

FIG. 6 is a flow chart which shows the steps and information flow of the subject invention. Using the MFP and methods and apparatus described in this invention, it is possible to create and modify collections on a collection server. A new, empty collection can be created. A new non-empty collection can be created using available documents and media. Electronic media and paper documents can be added to existing collections. A collection can be printed. The media in a collection can be explored or perused on the display 120 of the MFP 100. Special coversheets can be created which allow only certain operations on collections, including read-only coversheets where the media can be printed or viewed, but the collection cannot be modified in any way.

Collections can be merged. Collections can be forwarded to additional email addresses. Also, actions can be taken on individual media in a collection using notes or actions written on the coversheet. Each of FIGS. 7 through 14 show more detail for the method and process of this invention.

A new empty collection can be created in the following manner. No existing DRI or collection will be needed for the new empty collection, so in FIG. 7 at block 700, the "No" branch is taken. At 712, no additional documents are needed and then at the following block 716, no digital objects are created and the process moves to block 800 in FIG. 8.

At block 800, the user chooses the "Create Empty Collection" selector to initiate the creation of a new empty collection. The system then moves to block 900 in FIG. 9 and determines whether or not media is required for this process. Since an empty collection requires no media, the rest of block 604 is skipped entirely.

The decision in block 900 could be driven by the absence of media rather than a decision based on the chosen task. Notice that the difference between creating a new empty collection and creating a new non-empty collection is simply that in the first case, no documents are put in the automatic document feeder of the MFP 100 and no electronic media is made available to the MFP 100 in block 600. In other words, the system could use a single button labeled "Create New Collection" to initiate both tasks and complete the task in different ways based on whether or not any documents or media were available to the MFP 100. Decision 900 would then be relabeled "Media available?"

Figure 10:
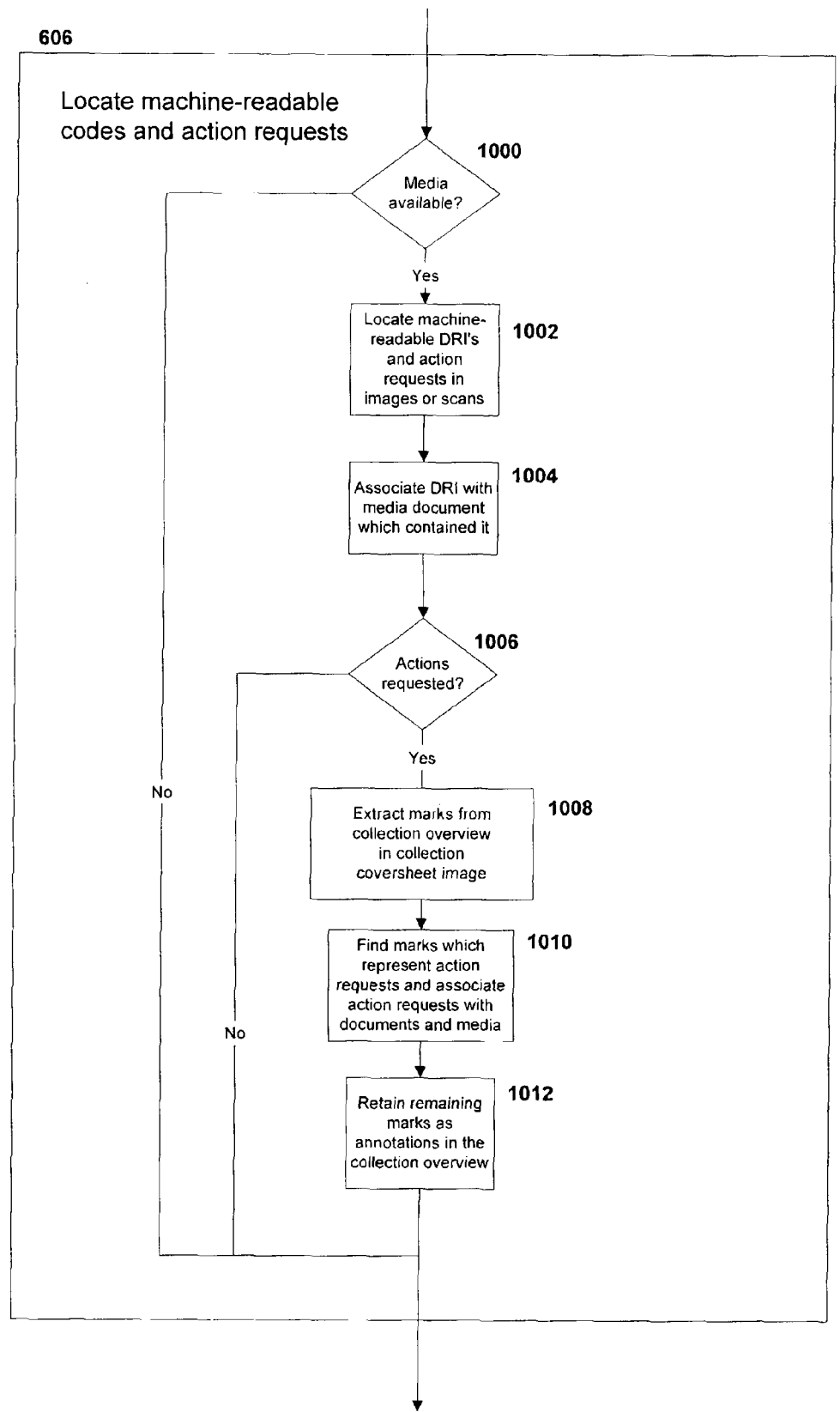
FIG. 10 is a flow diagram highlighting the steps for finding machine-readable codes or information in the present invention.

Block 1000 in FIG. 10 shows the next decision point. When creating an empty collection, no media is available so blocks 1002, 1004, 1006, 1008, 1010 and 1012 are skipped.

Figure 11:
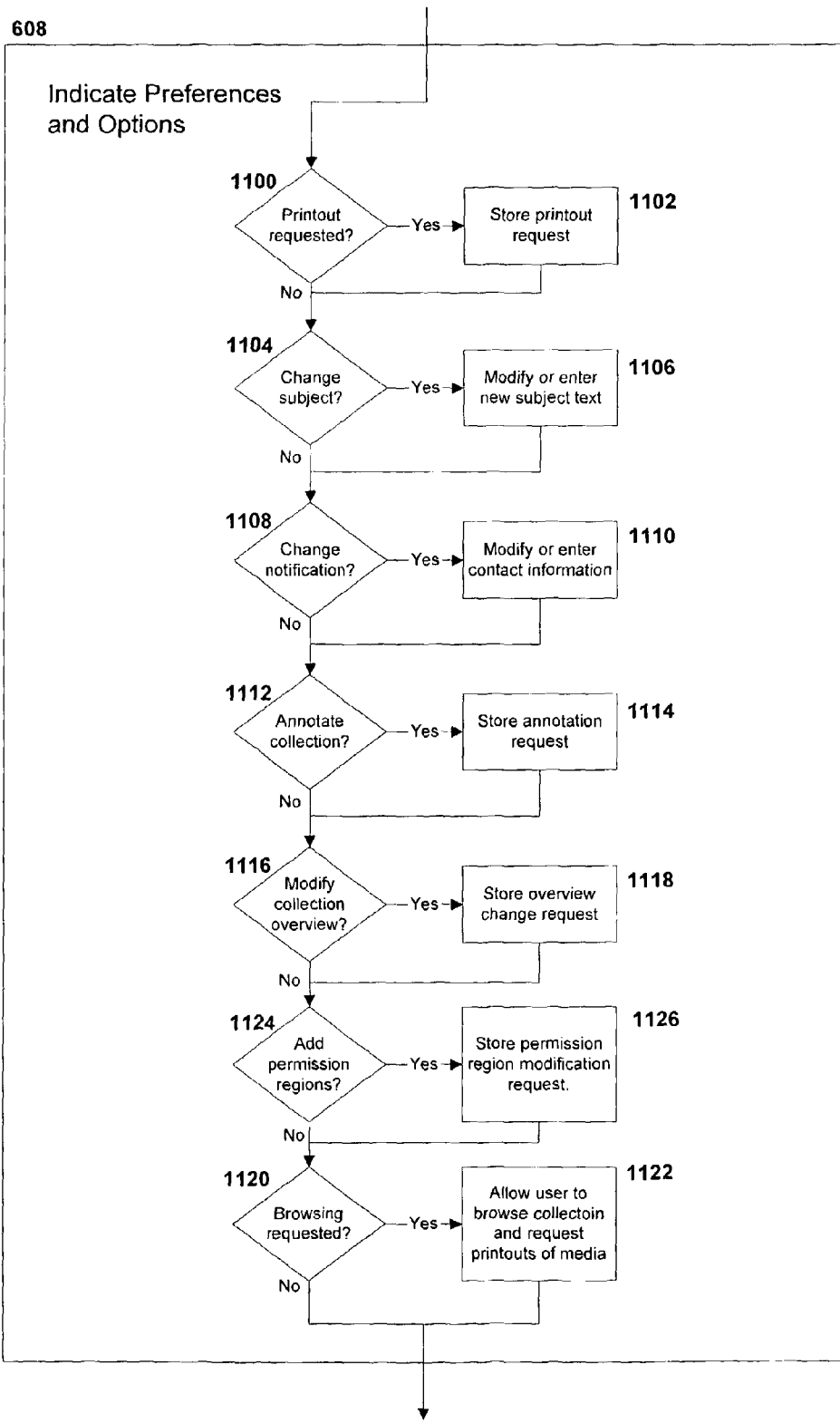
FIG. 11 is a flow diagram showing how the present invention in one embodiment might request and store user options and preferences.
Figure 25:
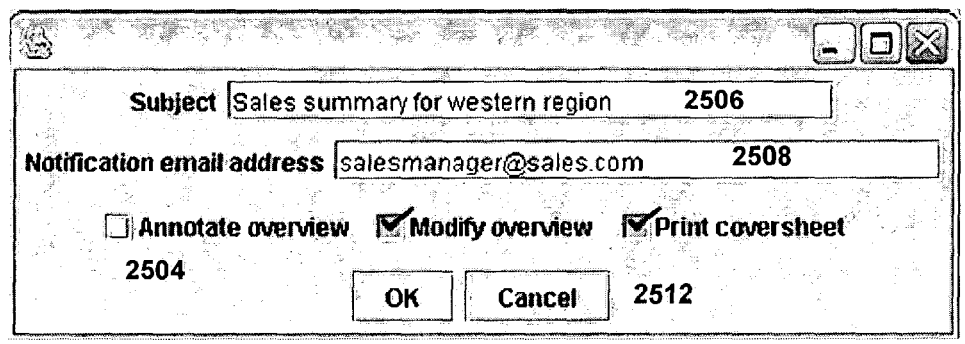
FIG. 25A shows a pictorial representation of a user input screen used in the present invention for adding a title and notification information and requesting printouts and modifications when creating or modifying collections.
FIG. 25B shows a pictorial representation of a user input screen for capturing a text string on a small touchscreen such as those used on some multi-function peripherals.
Figure 25:
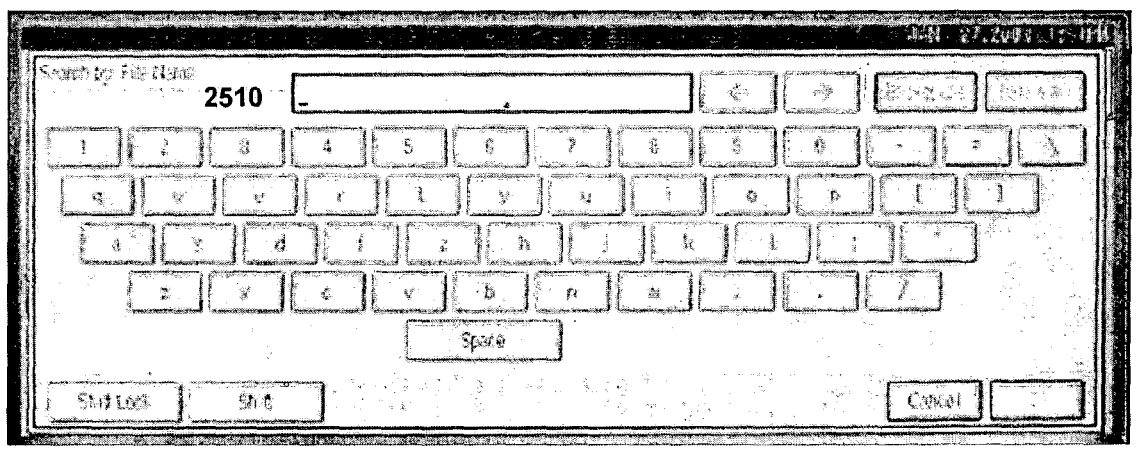

Turning now to FIG. 11, blocks 1100, 1104, 1108, 1112, 1116, 1124, and 1120 are all decisions made by either the user or made by the MFP 100. The user can select options preferably through the control panel 106 of the MFP 100. For example, the dialog box 2500 shown in FIG. 25A and the virtual keyboard 2502 input shown in FIG. 25B could be used for entering collection subjects 2506 or email addresses 2508 while performing the steps indicated inside the preferences and options block 608. FIG. 25A shows an example of a dialog box 2500 that could be used for requesting some information from the user of the MFP 100. FIG. 25B shows a screen shot of a virtual keyboard 2502 displayed on the touch-screen of a Ricoh Aficio 1045 MFP 100 which is available for capturing information from the user of the MFP 100. This type of interaction is well understood and known in the art.

While creating a new collection, either a printout must be generated or the information about the new collection, including at least the DRI must be emailed or faxed to someone. Otherwise, the DRI will be lost to all but the collection server and will not be available for adding documents because no one will have or be able to guess the DRI.

At step 1100, if the user indicates that a printout of the coversheet should occur, then the MFP 100 at step 1102 stores an indicator that a printout of the coversheet should be performed. The indicator can be stored in memory or another appropriate place using means well understood in the art. If the user does not request a coversheet printout, the user and MFP move to the next step, block 1104.

It should be understood that although the options presented in blocks 1100, 1104, 1108, 1112, 1116, 1124, and 1120 are shown in the figure in a particular order, they need not be presented only in that order. It may make sense to present them in a different order or to present some or all of the options at once to the user of the MFP 100. The user could then decide in what order to address the options or which ones to leave as they are. Typically a set of options like those shown in block 608 are presented all at once in the form of a dialog box similar to the dialog 2500 shown in FIG. 25A. At any time, the user can choose to type in a subject in the subject box 2506, type in an email address in the email box 2508, or select annotate, modify, or print by checking the appropriate checkbox 2504. When the user has finished selecting options, she can press a button 2512, either the "OK" button to record the options or the "Cancel" button to cancel the selected options.

For creating a new, empty collection, the options shown in blocks 1100, 1104, 1108, and 1112 should be presented in some form to the user. If any of those options are selected, then the corresponding steps 1102, 1106, 1110, 1114 should be taken. In the case of a new collection, one of printing out the coversheet or faxing or emailing the collection identifier/DRI should be done. If the user indicates not to print at 1100 and provides no contact information at 1108, the MFP 100 should either print the coversheet anyway or let the user know that an email address is required. Without one of these options being activated, it is not necessary to complete the rest of the task because the collection will not be available to anyone.

When a user is adding to an existing collection, it is not necessary to have an email address or print, because that user already has a collection coversheet with the collection ID on it and the collection may also be associated with a set of one or more email addresses.

Step 1116 is ignored and skipped when creating a new collection because there is no layout to modify. However, it is possible to annotate a new empty collection by adding sketch marks or annotations which are stored in the SVG file as noted previously. If the user chooses to annotate a new empty collection at 1112, then the MFP stores an indicator so that at the appropriate time later in the process the user is given the option of adding annotations.

Step 1124 is not skipped because it is possible to establish all of or a portion of a new empty collection as "add-only". A new "add-only" collection would be analogous to an anonymous ftp site which allows uploads but not directory listings. Such an ftp site is frequently used to allow many people to add documents to a directory where only a few people have permission to view the documents in that directory.

Step 1120 is skipped when creating a new empty collection because it is impossible to browse an empty collection.

There are many other options that will be clear to those skilled in the art which the user can select in block 608 that are not explicitly shown. It will be understood that it is impossible to enumerate all of the options available to the user and so a representative subset was chosen. It is understood that an option not shown might still be presented by the MFP 100 and selected by the user and this interaction will be considered within the scope of this invention.

Figure 12:
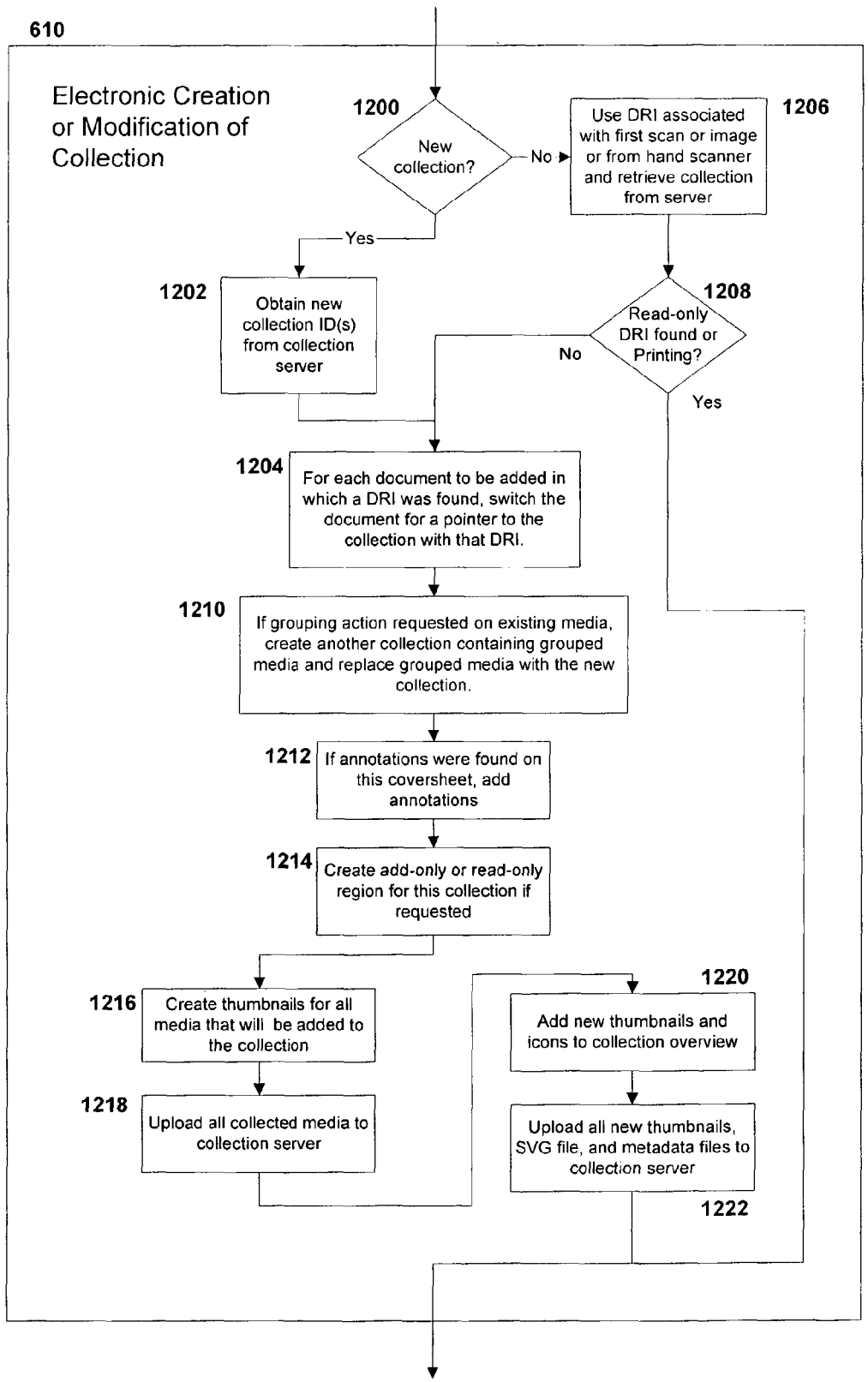
FIG. 12 is a flow chart showing various steps in the electronic or automatic creation or modification of a collection using the present invention.

In FIG. 12, at step 1200, since this is a new collection, the "Yes" branch is taken. The MFP 100 contacts the collection server 108 through the network 200 to request a new collection identifier or DRI. It should be understood that it is possible for the MFP to request identifiers in advance so that if the collection server is busy or temporarily offline, the MFP 100 can still create new collections. Preferably, the collection server is available during the operation of this invention.

After block 1202, when creating a new empty collection, no other tasks from FIG. 12 will be performed. None of blocks 1204, 1210, 1212, 1214, 1216, 1218, 1220, or 1222 apply to empty collections and those blocks are skipped.

Figure 13:
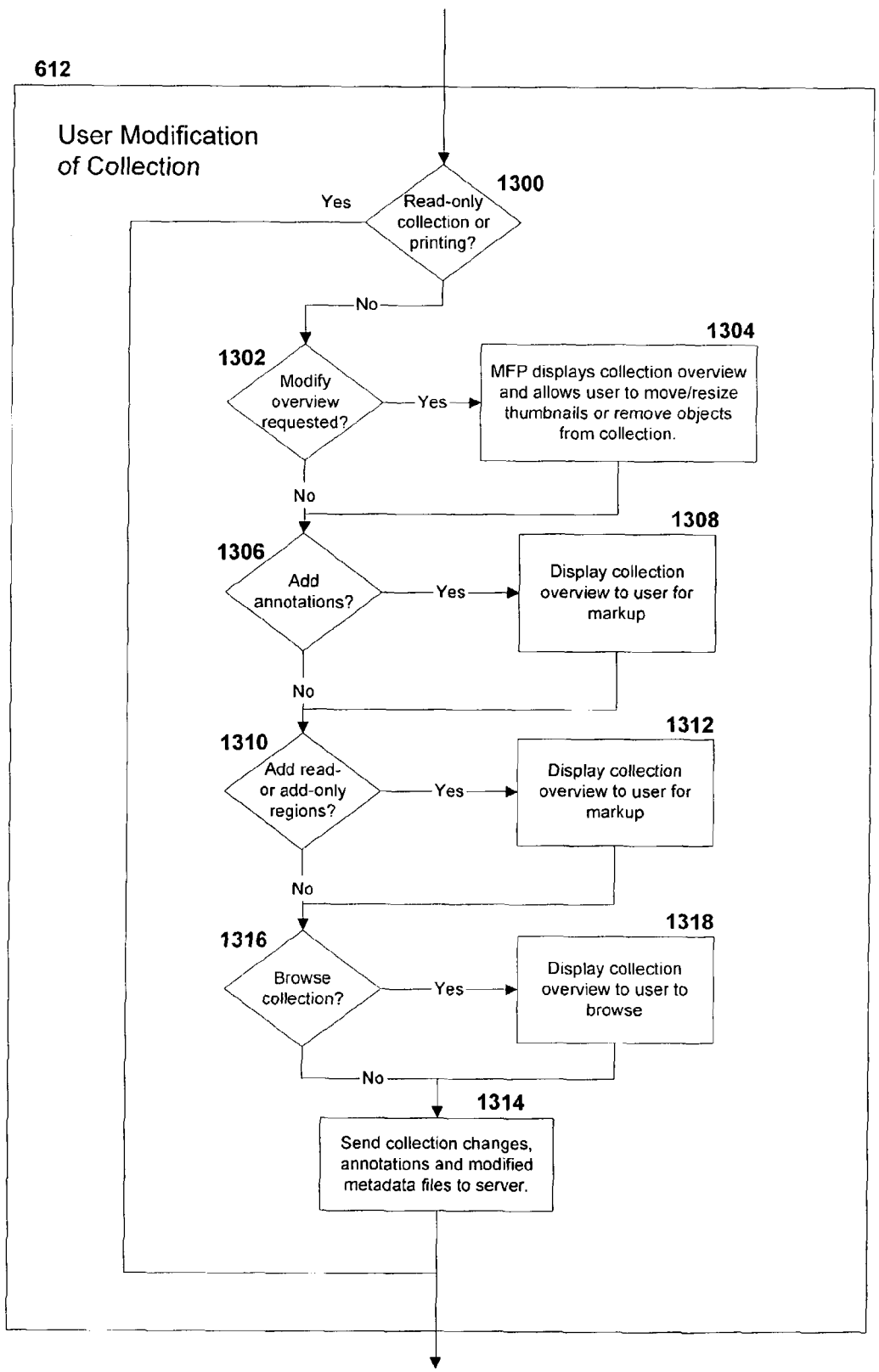
FIG. 13 is a flow chart highlighting possible user modification of a collection.

Now, in FIG. 13, the user is given the option of modifying the collection. Only block 1306, 1310, and 1314 apply in this case. If the user has requested an opportunity to add annotations to this new empty collection, the MFP 100 can present a canvas and drawing tools like those found in any drawing program. In the preferred embodiment, a pen tool and a text tool would be provided to the user to allow her to sketch or draw on the empty canvas or add text notes or labels. Interfaces for drawing or adding text to a blank canvas are well known. When the user indicates that the annotation step is complete, the MFP 100 can convert the sketch marks and text into valid SVG elements and store those in the SVG file representing the new empty collection.

In the present invention, it is possible to create "add-only" or "read-only" collections. An "add-only" collection allows the user to add documents or media to the collection but does not allow the user to access any of the documents in the collection. For each "add-only" collection, there must be a corresponding "read-write" or full permission collection which points to the exact same collection of documents but is not restrictive in its access. The primary difference between the two collections with different access restrictions is the pointer with which the collection is accessed.

Suppose a regional sales manager wanted all of her salespeople to submit sales figures electronically using the present invention. She could create a collection which has a text note containing instructions for adding sales data to the collection. She could then create a "add-only" version of that collection. Using the "add-only" version of the collection, all the sales people could use the same collection coversheet to add pages of sales information to a collection without being able to access the sales information from other salespeople. The regional sales manager would retain the full permission collection coversheet so that she could access all of the information from the reporting salespeople.

By creating a "read-only" or locked collection, it is possible to give many people access to a collection of documents or media while preventing them from modifying it in any way. A "read-only" collection might have an underlying full-permission collection.

At block 1310 the user would probably not want to create a read-only collection because there is nothing to read when creating an empty collection. However, it is possible to create an empty "add-only" collection and if the user has selected that option in step 608 while indicating options and preferences, an add-only collection is created.

It is also possible to create a collection which has one or more read-only or add-only regions which are a subset of the complete overview. At block 1312, the overview of the collection is displayed preferably on the MFPs control panel display 120 and the user is provided with a set of tools which can be used to draw the boundaries of restricted permission regions. These tools could be like the selection tools found in Adobe Corporations Photoshop. Such selection tools and techniques are well known.

For each selected area, a permission could be established including "full-permission" or "read-write" which is the default, "read-only", or "add-only". Additional different permissions could be assigned as well and are considered to fall within the scope of this invention. Such permission regions could be noted in some metadata file within the collection, including either the main metadata file or a special metadata file which is specific to the permissions.

At block 1316, the "No" path is taken because the collection is only browsed during the "Print Collection" or "Browse Collection Contents" task.

At block 1314, all annotations are sent to the collection server. In other words, the SVG file is created and stored in the collection server at the directory pointed to by the collection identifier or DRI. Also, metadata files are uploaded if necessary.

Figure 14:
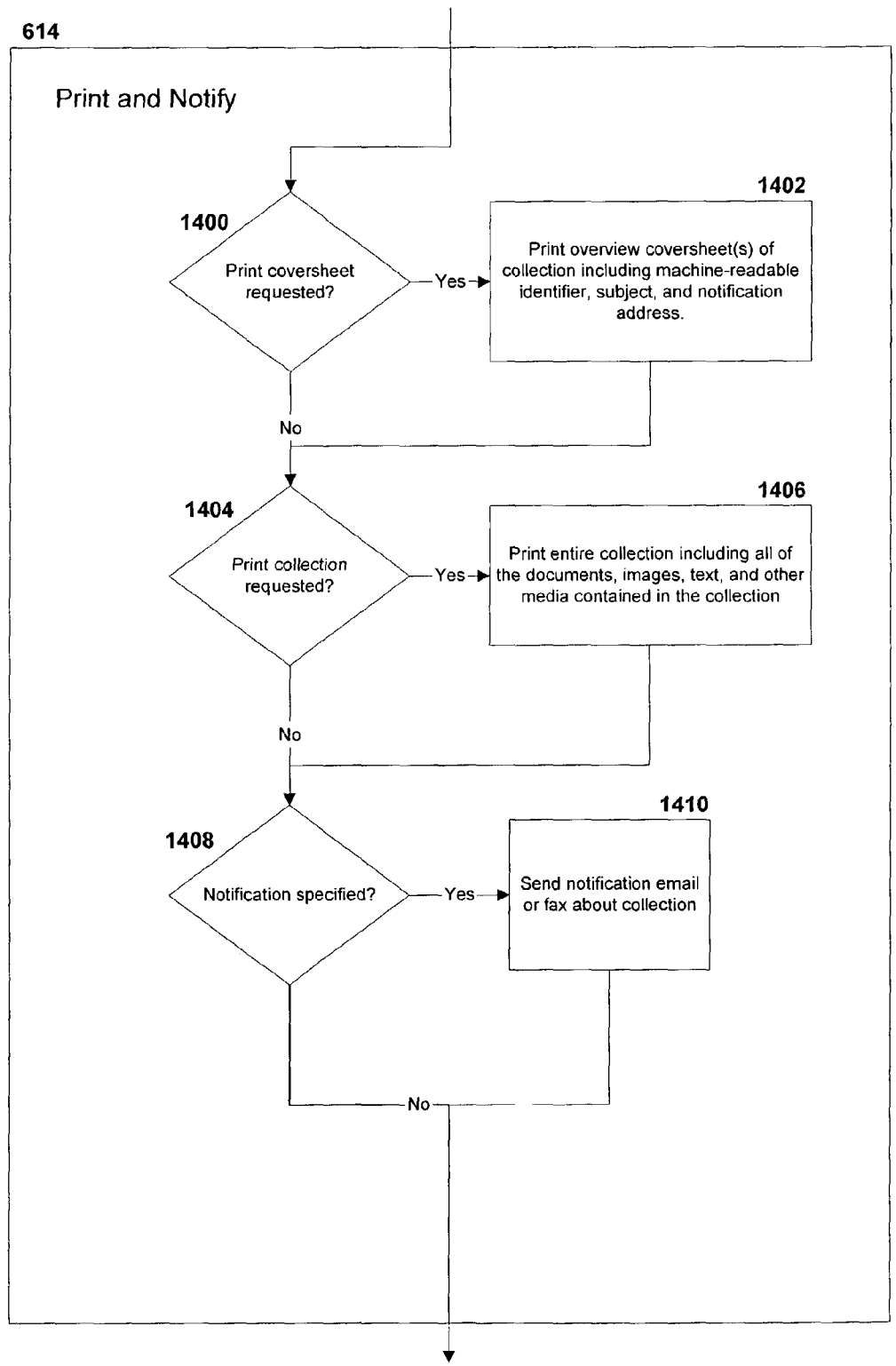
FIG. 14 is a flow chart showing the steps taken during printing of a collection and notification of the existence of a new or modified collection.

In FIG. 14, if the coversheet 102 is to be printed 1400 then at block 1402 the MFP 100 composes a coversheet 102. A header block 502 is created including at least the date and time of the creation of the new collection. The DRI or identifier obtained from the collection server is added to the coversheet at the bottom in human-readable form 510 and then encoded in a industry standard two dimensional PDF417 type barcode 504 in the preferred embodiment and added to the upper right-hand corner of the coversheet. The SVG representing the overview 506 is converted to image form and added to the appropriate place in the coversheet. Additional information might also be added as deemed appropriate. The composition of the coversheet described here is one preferred possibility but anyone skilled in the art will recognize that there are many ways to lay out or compose a coversheet which are within the scope of this invention.

Once the coversheet 102 is composed it is printed using the printer 304 of the MFP 100. The "No" branch of the decision at block 1404 is taken since this collection is empty and there is nothing to print out other than the coversheet. If an email address was supplied in block 1110, the "Yes" branch of decision 1408 is taken and a notification is now sent at block 1410 to the email recipients specified and the task is complete 616. The user can pick up the printed coversheet from the printer if a coversheet was requested and the recipients of the email notification can check their email for the notification.

In the preferred embodiment, the collection server 108 is responsible for sending the email notification once the collection has been uploaded and put in place. The specific contents of the email is not important as long as a DRI is provided to the recipient so that the recipient can access the collection. Note that the collection server must be running some type of server like a web server that provides access to the collection once it is uploaded. This is well known and understood in the computing field so no additional explanation is required.

Figure 8:
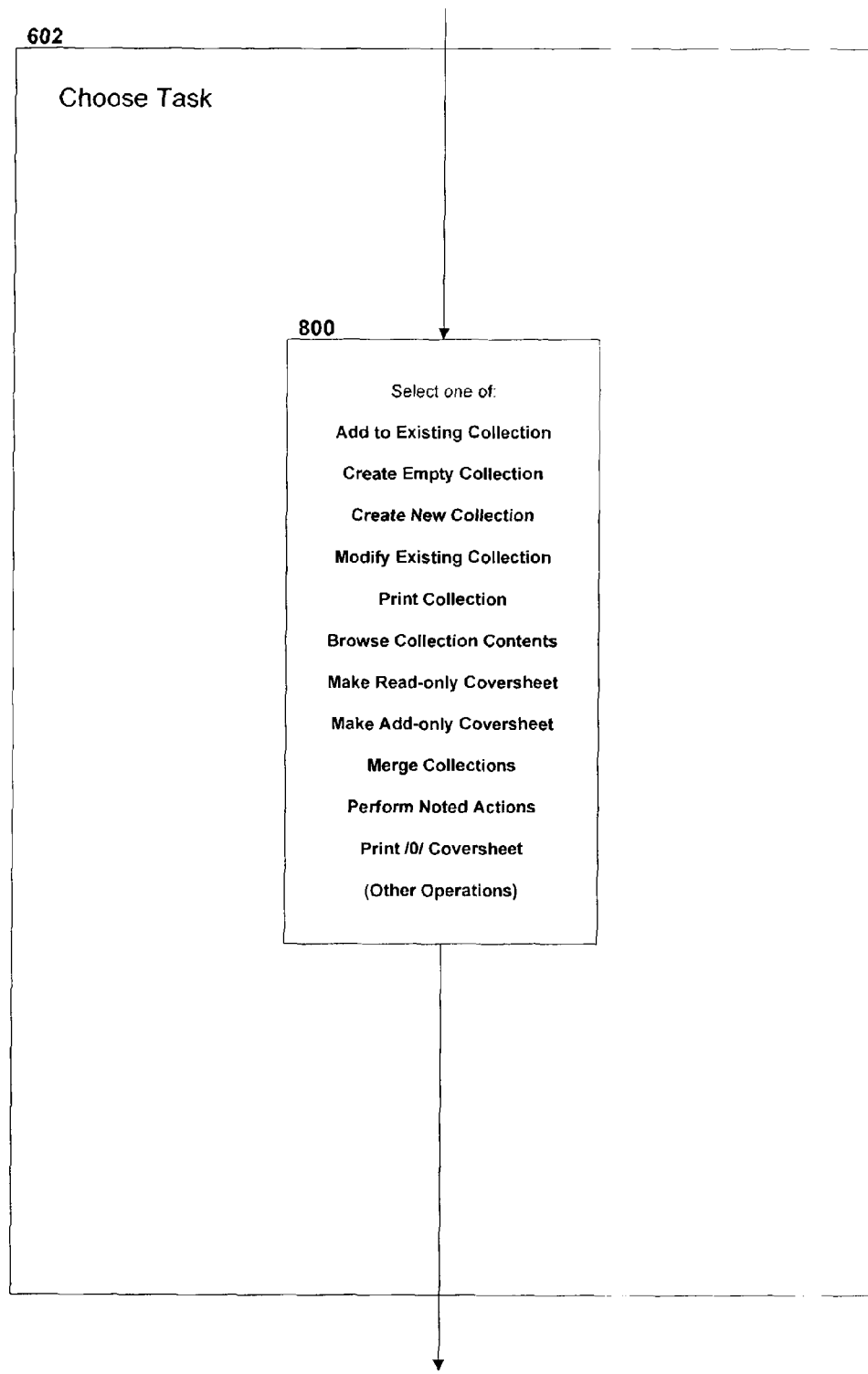
FIG. 8 is a flow diagram, showing some of the tasks that might be chosen by the user of the present invention.
Figure 9:
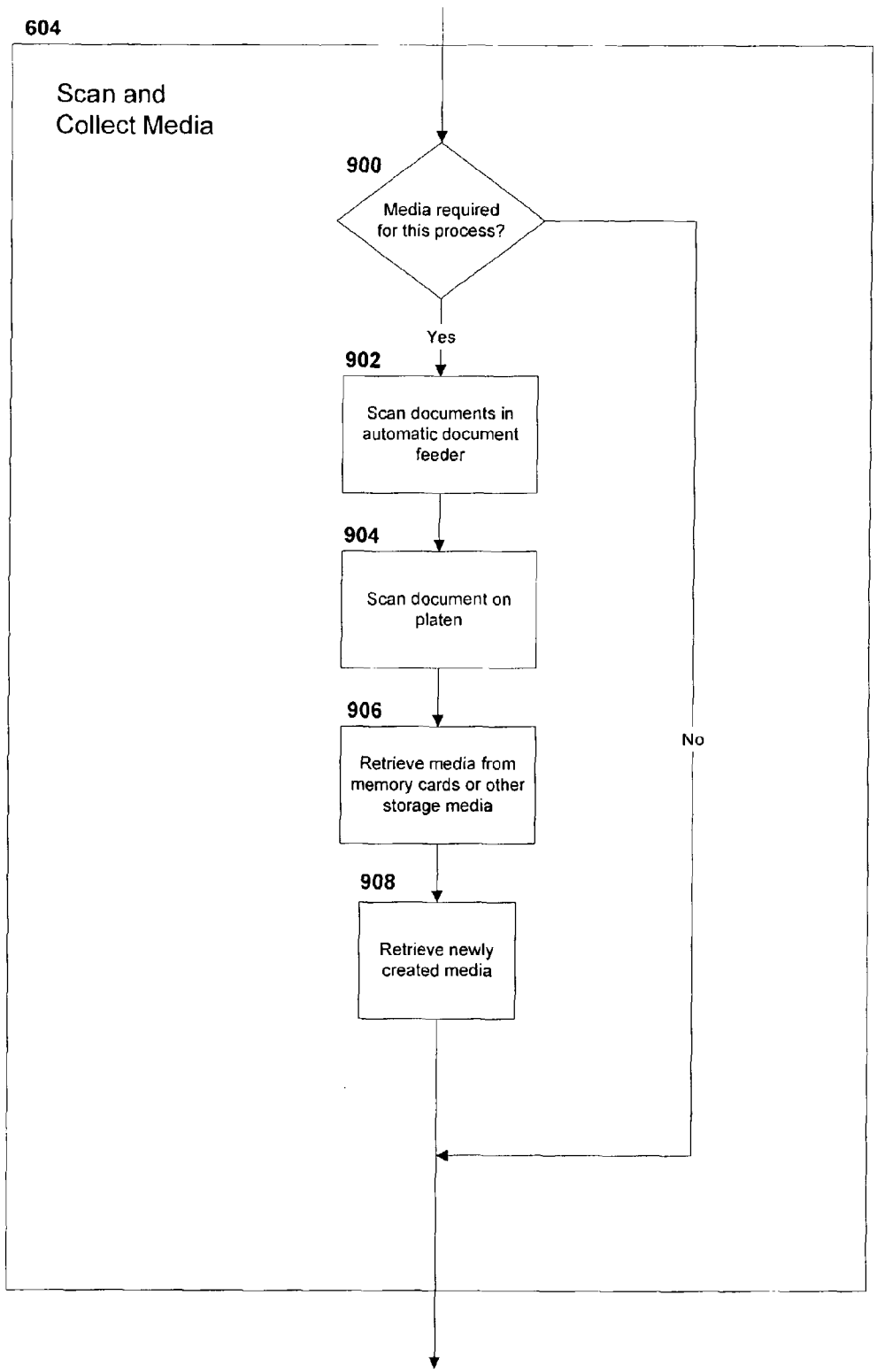
FIG. 9 is a flow diagram showing some of the steps for collecting and retrieving media for a new or modified collection of the present invention.

Block 602 shown in FIG. 6 and in detail in FIG. 8 shows more than 10 tasks that can be performed using the present invention. One task, that of creating a new empty collection has been described. The other additional tasks follow essentially the same path through the flow diagram of FIG. 6 but take different actions in each of the detailed flow diagrams depending on the task. Where necessary, some of the additional tasks will be explained in detail, but many of the operations are easily understood by those skilled in the art and will not be explained exhaustively.

The task of adding to an existing collection requires a collection to exist. To add to that collection at the MFP 100, the user must have a coversheet 102 from the existing collection. As mentioned, each collection identifier represents a single collection but collections can change over time. Each time a collection changes, the last path element in the DRI is modified. Those who have access to a single collection are thereby easily given access to all versions of that collection. For this invention, the version name or final pathname of /0/ has a special significance and means the "latest" or "most recently created" version.

Figure 21:
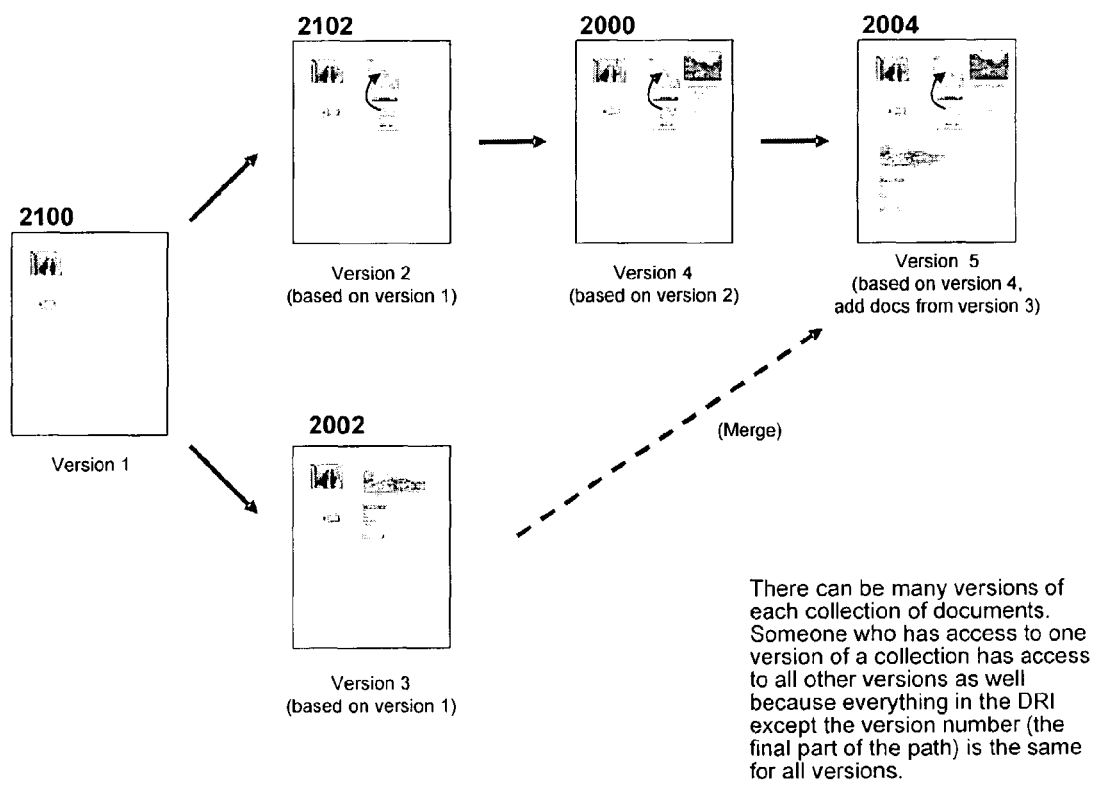
FIG. 21 illustrates how a single collection that branches into separate versions might be merged back into a single version containing the entire collection from both versions of the collection.

Preferably, pathname /1/ indicates the first version of the collection, /2/ represents the second version, etc. When a new collection is uploaded to the collection server, a new directory using the next integer is created. The next collection after /2/ would preferably be called /3/. In order to maintain unique version numbers, it is essential that only one device, i.e., the collection server, create the version number of final pathname. The version number cannot be created by the MFP because multiple MFPs might generate a number at the same time and choose the same name. Instead, the MFPs create a collection and upload it to a temporary directory on the collection server and when everything is uploaded, the collection server moves it into place and assigns the final pathname. FIG. 21 shows collection 2102 which is a new version of collection 2100 and 2002 which is a new version of 2100 also. It is easy to imagine two separate MFPs creating new versions of the /1/ collection 2100 simultaneously. If they could each choose a version number, they might both choose /2/. Instead, the MFPs preferably indicate to the collection server the collection on which the new version of the collections are based and the collection server assigns the new version numbers and prevents naming collisions.

When a document is added to a collection, it might be convenient to add it to the latest version of the collection regardless of which version of the DRI is on the coversheet. In the preferred embodiment, the /0/ pathname is chosen to signify the latest or most recent version of a collection. /0/ always indicates that any operation take place on the most recent version or latest version available. For instance, if someone creates a new collection it will be labeled /1/. After five modifications, the DRI of the latest version ends in /6/ in the preferred embodiment. The original creator of the collection might not have a collection coversheet with the DRI of the latest version on it.

Using a coversheet which is labeled /0/ for any of the operations enumerated in block 800 indicates to the MFP that the latest version should be used for the operation. For instance, when a printout of a collection is requested, the MFP would normally print out the version specified in the DRI. If the DRI has a /0/ at the end, this would tell the MFP to print the most recent version of the collection that it can access on the collection server. Of course, it's possible to ask the MFP 100 to print out the most recent version even with a coversheet with a DRI that doesn't end in /0/. If the MFP 100 gives the option to the user to print either the version on the coversheet or the latest version, the user can indicate her preference using the control panel 106 on the MFP 100. In each instance of an operation made possible by this invention, it is clear that the MFP could ask the user whether to use the given or latest version of the collection for the operation.

When creating a new collection, many of the steps taken by the user and the MFP are the same as when creating a new empty collection. The first difference is highlighted in the flow chart of FIG. 7. An existing DRI is not needed for this task and so no media or coversheets are required and from block 700 the "No" path is followed to block 712.

If the user has additional paper documents 104 at decision point 712, they can be placed on the automatic document feeder 308 at step 714. If the user has images or other documents in a memory card or some other media 116, the media 116 can be placed in the appropriate reader 310 312 or 314 during step 714. If there are no existing documents or media to add to the new collection, block 714 can be bypassed.

At block 716, if the user wishes to create some electronic media at the time of the creation of the new collection, step 718 is where the user records audio, video, still images, or other electronic media using any of the microphone 110 digital camera 112, video camera 114, or other media capturing device. If no new media is required, block 718 can be bypassed.

At block 800 in FIG. 8, the user indicates that a new collection should be created. Block 900 in FIG. 9 directs the flow along the "Yes" path since media is required for a new non-empty collection. Steps 902, 904, 906, and 908 are taken to retrieve any media paced on or in the MFP 100 by the user or recorded by the user. Those skilled in the art will understand that it is possible to find media by checking sensors, activating scanners, or searching file systems on connected memory cards. If the MFP 100 recorded audio or images using any of the recording devices 110, 112, or 114, it would have kept a pointer to that new media, perhaps in memory 318 or on an internal storage device 316 and the MFP 100 would select the newly created media as well.

If in block 604 no media was found because the user had not placed any media in a scanner or reader and had not recorded any new media, the MFP 100, through the control panel 106, could ask the user if she would like to create a new empty collection. If the response was affirmative, the remainder of the path through the flow charts in FIGS. 6-14 would be the same as creating a new empty collection which has already be described. In fact, it will be clear that it is not necessary for the user to differentiate between creating an empty collection and creating a new non-empty collection because the decisions on which path to take through the task flow charts are the same for both tasks except for a few key places. In those places, when there is media available, one path is taken and when there is not media available another path is taken. The user could just press a button labeled "New Collection" and if no media was available a new empty collection could be created and if there was media, a new collection with media could be created instead.

At block 1000, the "Yes" path is chosen because there is media available when creating a non-empty collection. In block 1002, the MFP 100 searches through images—the scanned documents 104 and captured images from a digital cameras 112, 114 or memory card 116 to find machine readable indicia containing DRIs 504. Techniques for locating barcodes in images is known in the art and available from a variety of sources.

In addition to searching for barcodes, the MFP 100 can search for "action requests" or written instructions to perform some action on a particular document in the collection. In the case of creating a new collection, no action requests are handled and so it is not necessary to look for them in block 1002. Action requests will be described in detail when discussing the "Perform noted actions" task from block 800.

In block 1004, each DRI is associated with the page of the document or image in which it was found. Since a new collection is being created, a DRI is not needed. However, the MFP 100 can recognize that a page containing a DRI represents a collection. Putting a page with a DRI into any collection, new or existing, could be understood as a request to add that collection to the new collection. In other words, the page containing the DRI represents a request to add the collection pointed to by that DRI to the new collection. The overview image of that collection will be retrieved and added as a thumbnail to the new collection and the subject of that collection will be used as the title for the thumbnail.

At block 1006, the "No" branch is taken because no action requests will be fulfilled in the creation of a new collection.

As in the creation of a new empty collection, it is desirable to query the user for preferences and options. If the user would like to email the DRI of the new collection to someone, she can indicate which email address or addresses should be notified in block 608. Only block 1116 and 1118 are different in this task than the new empty collection task described earlier. With an empty collection, there is no layout to modify. However, with a new non-empty collection the user might want to move around the thumbnails that represent the documents that are being added to the collection. Block 1116 represents the inquiry of the user about her preference and block 1118 indicates that the MFP 100 will store the preference for later recall at the appropriate time. While it is possible to browse a new collection after it has been created, block 1120 and 1122 are primarily related to the "Browse Collection" task and will be explained in more detail when that task is described. Blocks 1124 and 1126 are applicable to new non-empty collections.

Moving now to block 1200 in block 610, FIG. 12, the "Yes" path is taken to block 1202 because this is a new collection. One or more new identification numbers are requested and received from the collection server 108. Typically, only a single collection identifier is needed for a new collection. However, if the user desires to add some restrictions to the collection, more than a single collection ID might be needed. When creating an "add-only" collection where documents can be added but not retrieved, two collection identifiers are needed. Both collection identifiers will point to the same collection. One identifier will allow the user only to add documents or media to the collection and not allow the user to access the documents in the collection. The other identifier will allow full read-write access to the collection. If only a single collection ID had been acquired, there would be no way to access the contents of the collection, only add to it. Permission-based collection ID's will be discussed in detail later in the specification.

In block 1204, each document or page which was found to contain a DRI in machine-readable form is replaced with an image representing the collection pointed to by that DRI.

Blocks 1210 and 1212 are concerned with action requests and are not applicable to the current task of creating a new non-empty collection. Block 1214 applies only to tasks concerning restricted collections and is also skipped. At 1216, a thumbnail is created for each page or document or other media. The thumbnail is preferably a smaller version of the page that is similar in appearance but smaller in storage size and in number of pixels. With recorded audio, a thumbnail is just a representation of the audio and could be a waveform or even an standard computer icon representing the audio. In the preferred embodiment, the audio could be displayed as a rectangle containing a waveform whose shape is based on the audio content and whose length corresponds to the duration of the audio recording. A video thumbnail could be a single frame or a small number of representative frames from the video composited into a single small image. Those who are skilled in the art will understand that there are many various ways of creating thumbnails to represent media. In block 1204, each collection coversheet was replaced with a collection overview image which is now reduced to form a thumbnail.

All of the media and documents for the new collection are now added to the collection at block 1218 which means that they are uploaded to the collection server 108 and placed in the directory pointed to by the DRI of the new collection. There are many well known protocols for uploading files to a server, including ftp, scp, http PUT. Preferably, the HTTP PUT protocol is used which allows the MFP 100 to specify the location and contents of each media file as it is being uploaded.

At block 1220, the thumbnails representing the new media items are arranged in the collection overview. The thumbnails are placed in an appropriate manner within the overview, expanding the overview size if necessary. The SVG file representing the overview is written and uploaded to the collection server 108 and all of the thumbnails are uploaded also at block 1222.

Figure 18:
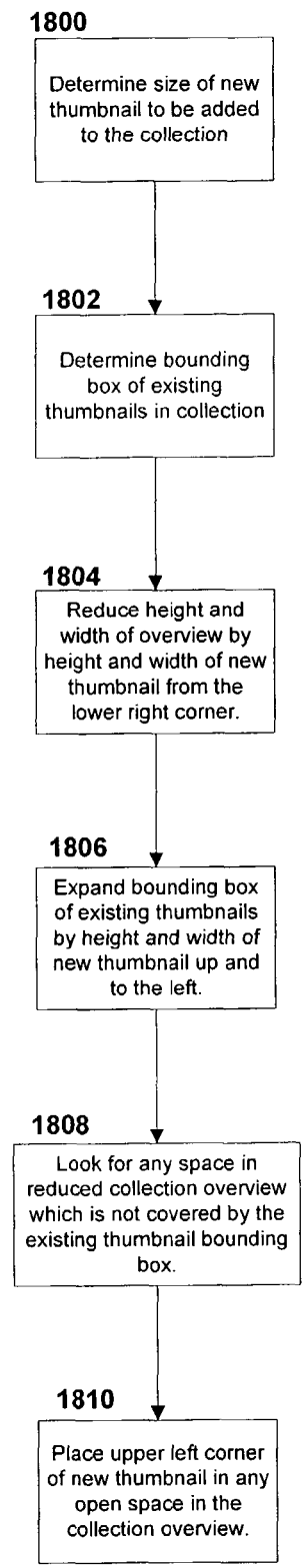
FIG. 18 is a flow diagram highlighting the steps required for automatically adding thumbnails of new media to the overview of a new or existing collection.
Figure 19:
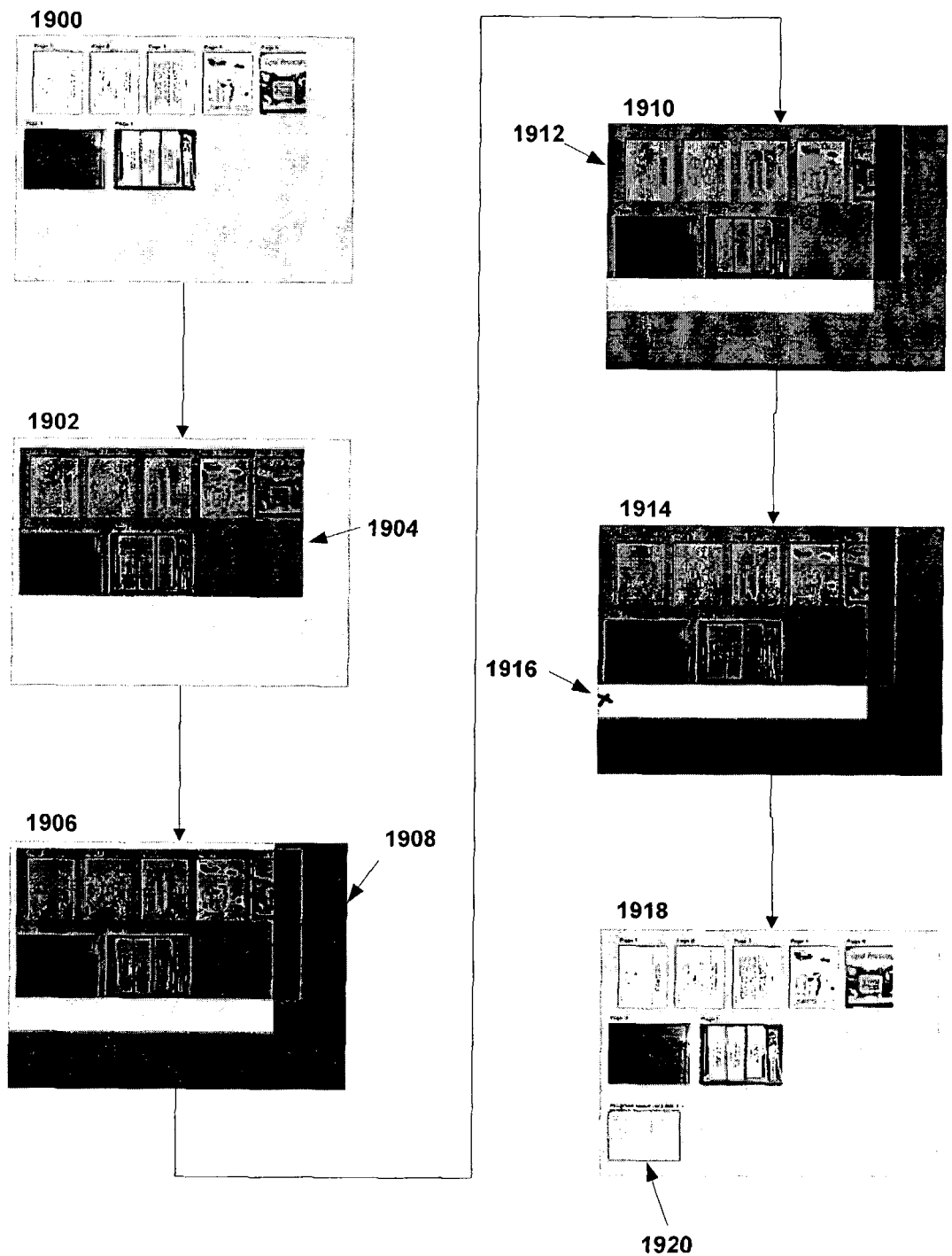
FIG. 19 is a pictorial representation illustrating the steps shown in FIG. 18 and the successful addition of a thumbnail to an existing collection overview.

The arrangement and placement of the thumbnails in the overview is shown in a flow chart in FIG. 18 and shown in a pictorial representation in FIG. 19. One preferred method for placing thumbnails is to find a place in the overview image where the thumbnail can be positioned where it will not overlap any other thumbnail. An exhaustive search—moving the thumbnail to different positions within the overview and looking for overlaps with other thumbnails—is too slow. Another approach and the preferred method is to reduce the problem to that of placing a single point. This can be done by reducing the size of the overview by the width and height of the thumbnail to be placed and enlarging the existing thumbnails by the same dimensions. The origin of the new thumbnail can be placed anywhere within the remaining space in the overview without overlapping existing thumbnails. This is known as a "configuration space" approach because instead of finding a new thumbnail location in the original two dimensional space of the overview, a new "available-space" region is calculated in which the origin of the thumbnail is placed instead of the entire thumbnail. Configuration space techniques for interference checking are well known in the field of robotics and path planning.

At block 1800, the size of the thumbnail to be added to the overview is determined. Thumbnail sizes are usually measured in pixels. Often thumbnails are chosen to be some standard size—chosen so that they neither the width nor height is larger than a certain maximum size—perhaps 150 pixels for standard display resolutions or two inches for printed thumbnails. Since some images might have a very large or very small aspect ratio, it might be more appropriate to limit the thumbnail to a maximum area—square pixels or square inches—rather than a maximum width and height.

For instance, an image that is 1000×20 pixels (width x height) would be 150×3 if made into a thumbnail based on a 150×150 pixel maximum size. A thumbnail that is only 3 pixels in height is not very useful.

A thumbnail that is 150 pixels by 150 pixels would have an area of 22,500 total square pixels. If, alternatively, each image was scaled so that it contained at most 22,500 pixels, then the same 1000×20 image, already having only 20,000 pixels, would not be reduced in size and the original image would be used as the thumbnail. An image having 500×80 pixels would have 40,000 pixels and would be reduced to 325×60 pixels totaling 22,500 pixels and maintaining the original aspect ratio.

Scaling an image so that it contains no more than some total number of pixels instead of restricting the width and height to be less than some maximum improves the overall appearance of the thumbnails and is the preferred method of selecting a thumbnail size. However, any method for choosing thumbnail sizes can be used for the present invention.

In block 1802, a "bounding box" is determined for all the thumbnails and annotations in the current overview of the collection. Picture 1902 shows the calculated bounding box 1904 completely covering all of the thumbnails in the overview. The calculation of a bounding box is well known in the art.

At block 1804, the available area of the overview for thumbnail placement is reduced by the width and height of the thumbnail to be added. Picture 1906 shows this reduction by the area 1908. At block 1806, the bounding box of the existing thumbnails is enlarged by the width and height of the chosen thumbnail. In this example, shown also in picture 1910, the new bounding box extends above and to the right of the overview and the extension beyond the boundaries of the overview are ignored. The new bounding box 1912 is shown in picture 1910.

At 1808, the available open space is calculated and then at 1810 a point is chosen which will be the origin or upper-left corner position of the thumbnail. The preferred point is shown in picture 1914 at point 1916. Picture 1918 shows the final overview with the thumbnail placed at 1920.

In block 1802, a single bounding box for all the thumbnails previously placed on the overview was calculated and the origin of the new thumbnail was placed outside of that bounding box. It is also possible and understood by extension that instead of calculating just a single bounding box, an individual bounding box for each thumbnail may be calculated and extended so that the new thumbnail can be placed in any available position in the overview. This is well understood by those experienced with path planning algorithms and would be analogous to allowing a machine to travel between obstacles instead of requiring the robot to go around all the obstacles.

Adding a second new thumbnail now to the overview shown in 1918 could be accomplished using the steps shown in FIG. 18. However, instead of adding one bounding box to cover all the thumbnails, simply adding a single box representative of the newly added thumbnail is the preferred approach. This box is calculated to be the size of the newly added thumbnail and then is extended up and to the left by the width and height of the thumbnail to be added, just like the first bounding box. The advantage of adding a new additional bounding box instead of redoing all the steps shown in FIG. 18 is that the next thumbnails can be added alongside the one that was just added. If a new overall bounding box was created instead, there would be a tendency for all new thumbnails to be placed below the one just added leaving a large amount of open space in the message.

Note that if there is no available space in the overview after calculating the bounding box and reducing the size of the overview, it is possible to extend the overview downwards to accommodate new thumbnails.

Back to block 1222 shown in FIG. 12, all new thumbnails are uploaded to the collection server as well as the new overview description file and metadata file.

Now, in FIG. 13, since this is not a read-only collection, the "No" path from block 1300 is taken to block 1302. If the user has requested that she be able to modify the overview, at 1304 the overview could be displayed on the MFPs control panel display 120 and the user could move or resize thumbnails of the newly added documents. The user could also remove objects from the collection if so desired.

If requested, the "Yes" path would be followed from block 1306 and the user could add annotations at step 1308 on the same overview display 120. Modifying the overview and adding annotations could be accomplished using an object-based drawing tool like those available in Microsoft's PowerPoint software or Adobe Illustrator or similar tools. These tools and techniques are well understood by those skilled in the art. The new annotations would be converted to the appropriate SVG elements and stored in the collection overview file.

At block 1310, if the user has indicated a preference at block 1124 to add permission regions, the overview could be displayed and selection tools could be presented to the user which allows the selection of regions of a variety of shapes on the overview. "Read-write", "read-only", or "add-only" permissions could be applied to each drawn or selected shape on the overview. Documents beneath a "read-only" selection region would be fixed and unchangeable in future interactions with the collection. Documents covered by an "add-only" region would not be seen in the "restricted" coversheet printed at block 1406 and could not be accessed using restricted collection identifiers or DRIs.

At block 1314, all modified information is sent to the collection server, including the metadata files, SVG overview file, and any changes in the collection.

At 1400, if requested, the "Yes" path is taken and a coversheet is printed. This coversheet 102 preferably includes the elements shown in FIG. 5B as described for new empty collections with the exception that the overview area 506 is not empty but shows the thumbnails of the media and documents including any annotations and modifications made by the user. If the user has requested a collection with at least one add-only region, then two coversheets should be printed. One printed coversheet is a normal collection coversheet with no permission restrictions. In other words, the DRI encoded in the barcode on the coversheet is associated with the full-permission collection containing all of the media and documents. Using the full-permission coversheet, it is possible to access all of the documents stored in the collection including documents added in the future. It is important to have available a coversheet without restrictions. If only the restricted coversheet was available for an "add-only" collection, then documents could be added but never retrieved.

The other printed coversheet will be the one for the restricted collection. The collection identifier or DRI printed on the restricted coversheet will point to a restricted collection and can be used only in the manner allowed in the restrictions. For instance, the add-only coversheet of a collection would only allow the user to add documents and not to see documents that have been added.

The "No" path from block 1404 is taken since the user has not selected the "Print collection" task. If email addresses have been specified in block 608, then the collection identifiers and optionally an overview image are emailed to the people who are supposed to be notified. In the case of restricted collections, there might be two sets of email addresses—those who are to receive the restricted collection identifier and those who are to receive the full-permission identifier. All email recipients are notified appropriately at block 1410.

Although it is not shown in FIG. 14, it is possible to notify by fax as well as email. Many other methods of notifying recipients of an available collection will be known to those skilled in the art and recognized as falling within the scope of this invention. For instance, if a fax number were supplied by the user of the invention and a faxed notification were requested, the MFP 100 could fax the appropriate coversheet to the number specified.

Suppose that the user of the present invention would like to add one or more documents or media to an existing collection. This task corresponds to the "Add to Existing Collection" task shown in block 800.

As in the "Create New Collection" task, the user brings media to the MFP 100 or creates it using media recording devices 110, 112, 114, and 116 or the like connected to the MFP 100 or to the network 200. Creating or collecting documents and media was explained in conjunction with the "Create New Collection Task". The main difference between creating a collection and adding to a collection is that the MFP needs to know to which collection to add new media.

The advantage of having a machine-readable collection identifier on a coversheet is that the MFP or any device which can locate and decode machine-readable codes can determine which collection is represented by the coversheet. The "Yes" path is followed from block 700 for the "Add to Collection" task. The user can indicate which collection the new media will be added to by typing in a collection identifier or DRI but this can be a difficult task because DRIs tend to be long random strings of characters. DRI's can be located and decoded from a scanned image or read using handheld barcode scanners if they are encoded in barcode format. Handheld scanners which read many different types of one and two dimensional barcodes are available from many companies like Hewlett-Packard Company of Palo Alto, Calif., USA. They can be also be read in text form using optical character recognition technology or decoded from a magnetic strip if properly encoded. If a coversheet of the collection is available, the coversheet should be placed on the MFP where it can be scanned, either in the automatic document feeder 308 or directly on the glass platen 309. Alternatively, the barcode can be scanned using a handheld scanner 710. If the barcode has been captured in a digital image, perhaps using the digital camera 112, the camera 112 can be directly connected to the MFP 100 or the memory card 116 from the camera can be plugged into the card reader 314. There are many other methods for presenting the MFP 100 with a machine-readable DRI and those methods and techniques are not enumerated here because they are understood by those skilled in the art.

The present invention conveniently prints out a machine-readable DRI as part of the coversheet of the collection. In the preferred embodiment the DRI is contained in a PDF417 format two-dimensional barcode on the coversheet and the coversheet is placed on the automatic document feeder 308 of the MFP 100. Additional documents or pages to be added to the collection are placed behind the coversheet. The additional pages can be any document pages or they can be coversheets of other messages.

Of course additional media can be captured or provided in some other way to the MFP 100 when the coversheet is placed in the automatic document feeder.

At block 608 or specifically block 800, the user can indicate a desire to "Add to Existing Collection". Since at block 900, media is required for the process, any documents placed in the automatic document feeder (ADF) 308 are processed and scanned and the images from those documents are stored in the storage 316 of the MFP 100 for more processing. Any documents on the platen 309 are also scanned and media from the memory cards 116 and other devices is retrieved at block 906 and 908. These media and documents will be added to the designated collection.

The "Yes" path from block 1000 is followed because there is media available. Each of the documents and media is searched for a machine-readable DRI. When a barcoded DRI is scanned using a handheld scanner, the DRI can be stored in the memory 318 of the MFP 100 so that it can be accessed when it is time to determine which collection to add the new media to. If the ADF 318 or platen 309 has been used to scan in a coversheet or if the DRI is contained in an image from the digital camera, the DRI will have to be read from the scanned or captured image in this step 1002. Either source of a DRI is acceptable and typically, if there is no DRI held in memory 318 due to hand scanning of a coversheet, the first scanned sheet or first image will contain the DRI. Those skilled in the art will recognize that there are many ways of providing the DRI to the MFP 100 an exhaustive list need not be provided.

At block 1002, while adding to an existing collection, no action requests are expected and therefore none will be located or decoded for this task. Since none were decoded, the "No" path is taken from 1006.

In block 608, all of the typical options and preferences are available to the user and this block is handled as explained previously.

In block 610 at block 1200, this is not a new collection and so the "No" path is followed to block 1206. As mentioned previously, if the DRI was not scanned in by hand, the "existing collection" DRI is taken from either the first scanned image or the first digital image. If a DRI is not found, the user can be asked if she wants to create a new collection. If a DRI is found in more than one place, either the user can be asked which to use as the existing collection, or one location can be given a higher priority and used first.

If the DRI found in step 1206 turns out to be a read-only collection, no documents can be added. In that case, some indication or error message should be displayed on the control panel 106 of the MFP 100 to indicate that a collection cannot be modified and the task is complete.

If it is not read-only, then step 1204 is taken. All of the image media including images which are scans of document pages is searched for machine-readable codes in step 1002. Typically, when adding a page or document to a collection, the image of that page is added to the collection storage area and a thumbnail is added to the overview. If that page happens to contain a machine-readable DRI then based on the users preference, instead of adding the page to the collection, the collection that the DRI represents can be added to the collection. In step 1204, for each page or image containing a DRI, the "page add" request is converted into a "collection add" request with the appropriate DRI representing the collection.

Block 1210 represents the results of an action request and will not be discussed here because the block is passed over for the "Add to Existing Collection" task.

Block 1212 indicates that annotations found on the coversheet should be added to the existing collection. In other words, if it is discovered by the MFP 100 that the collection overview has been modified, the marks made on the collection overview should be added to the collection overview when the new media is added.

Locating marks on a collection overview can be done in many different ways. One way will be described in detail. Suppose that a collection coversheet is printed out on a black and white or grayscale printer. Marks can be made on the overview part of that coversheet using a red pen. Those marks can easily be separated from the original image using colored filters. For instance, most digital cameras use arrays of red green and blue filters over their image sensing elements. If all of the pixels which contain some red are separated into a separate image, that image can be used as an overlay where non-red pixels are transparent and red pixels are painted on top of the original overview.

Since the overview is defined programmatically in the SVG file, it is also possible to construct an expected overview image for a collection and the expected image can be compared to the scanned or photographed image to look for differences. First, all the pixels of the actual image should be adjusted equally to match the overall contrast and brightness of the captured image. Then, all significantly different pixels could be extracted—for instance, pixels that originally appeared white but are now black could be separated and considered a new annotation.

Regardless of how the annotations are found, they can be converted into a semi-transparent overlay on top of the original overview or converted into lines and other shapes and inserted as annotations into the SVG file.

Block 1214 does not apply to the present task and so block 1216 is entered.

At block 1216, thumbnails are created for all of the new images, documents, pages, and media. For those pages which represent other collections, thumbnails are made for the collections instead of the page. At 1218, all collected media is uploaded to the collection server.

Step 1202 was skipped because a new collection identifier was not needed. However, it is important that the existing collection be changed in a way that makes the current state or version of the collection available at a later time. The new media should not be placed in the same storage area as the existing collection. Someone else might modify the same collection and try to access information or media that is no longer there.

As described in the section about DRI's, collections can have multiple versions. In other words, the first version of a collection might end with the /1/ pathname. The second version might end with the /2/ pathname, etc. When a collection is modified, the collection retains most of the same DRI, but has a different final pathname to indicate that it is a different version of the collection. This allows older versions of the collection to be available even as the collection is modified.

Typically, new media and thumbnails in a collection are uploaded to a staging area on the collection server. The staging area is associated with the collection identifier but doesn't have a permanent final pathname. As soon as all of the information has been uploaded and is complete, the collection server moves the collection into a final directory or storage area with a permanent final pathname. The permanent final pathname is usually the next integer after the most recently uploaded collection.

Figure 16:
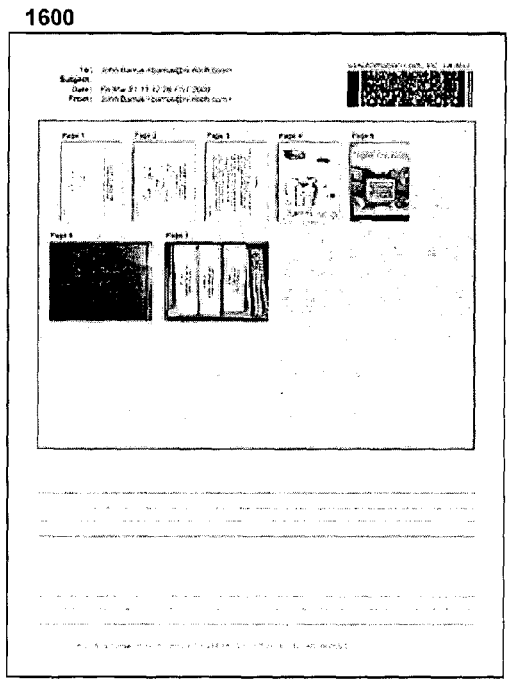
FIG. 16A show an example coversheets before adding new media to the collection.
FIG. 16B shows an example coversheet after adding new media to the collection.
Figure 16:
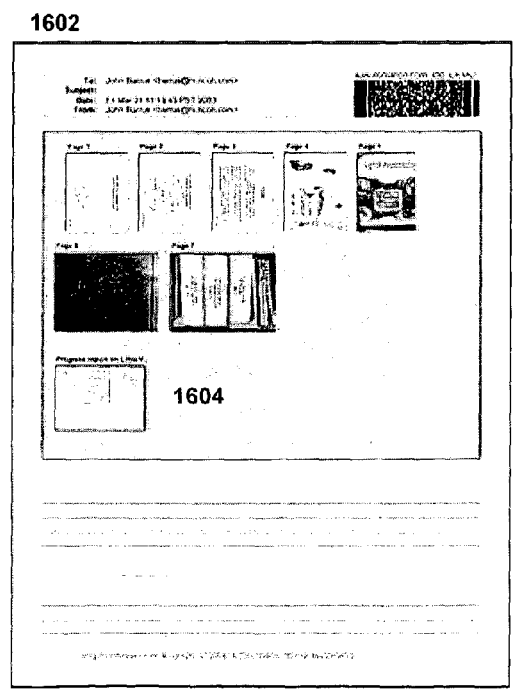

At block 1220 and as shown in FIGS. 18 and 19, all of the thumbnails representing the new media are added to the collection overview. FIGS. 16A and 16B show an example of a coversheet before and after a new document is added. FIG. 16A, the before picture 1600, contains seven thumbnails representing a combination of scanned pages and digital images. FIG. 16B, the after picture 1602, includes a thumbnail 1604 representing a collection that has been added to the collection. The thumbnail 1604 is a small version of the overview of the added collection.

At block 1222, all of the thumbnails, metadata, the overview SVG file, and new annotations (which are described in the overview SVG file) are uploaded to the staging area in the collection server.

Since this is not a read-only collection, the "No" path is taken from block 1300 and modifications are allowed to the collection. All of the automatic modifications were made in block 610 and now the user is allowed to make modifications. Depending on the user preferences, at block 1304 the user may be allowed to move or resize thumbnails or remove documents or media from the collection. Block 1304 represents changes to both the overview and the collection itself. Documents can be removed from the collection in 1304. At 1308, annotations may be added or erased from the collection overview. This block 1308 only represents changes made to annotations or things that appear in the overview SVG file.

If the user has indicated a desire to modify permissions of this collection, block 1314 is where those modifications are made and possible modifications have been described when detailing other tasks so they will not be repeated here.

At 1314, all changes and modifications are finally uploaded to the collection server 108 and at this point, the server has everything required to move the collection out of the staging area and into the final directory upon assigning a version number.

Note that if the user created a restrictive permission region in the modified collection, it will be necessary to get from the collection server a second identifier that represents the restricted collection.

Permissions are preferably handled and differentiated using collection identifiers. In other words, the collection server 108 should know that a single collection can be accessed using different pointers or identifiers and the identifiers indicate which permissions are allowed. This is analogous to Unix file system permissions and symbolic links. Each data file in a Unix file system has at least one pointer to the file stored in a directory. Links can be created which exist in other directories or perhaps in the same directory but with a different name. These links point to the exact same data on the disk as the original file, but have different metadata. That metadata includes the filename and full pathname, as well as file permissions. Unix files can be given restricted access which limits or allows certain individuals to read or write the file. A file can be set up so that it can be read, written, or deleted by anyone. The same file, through a link, can be given a more restrictive set of permissions, perhaps only letting one or a few people read the file and letting no one delete it. Even though the same data is pointed to by the two different pointers, what can be done with that data depends on the restrictions specified on the pointers, not on the data.

A collection server 108 can keep a mapping of collection identifiers to collection directories and keep track of which identifiers have read and write permission. When an MFP 100 makes modification requests to a collection server, if the identifier used to make the request is restricted in a way that doesn't permit that type of modification, the collection server can respond negatively.

Figure 24:
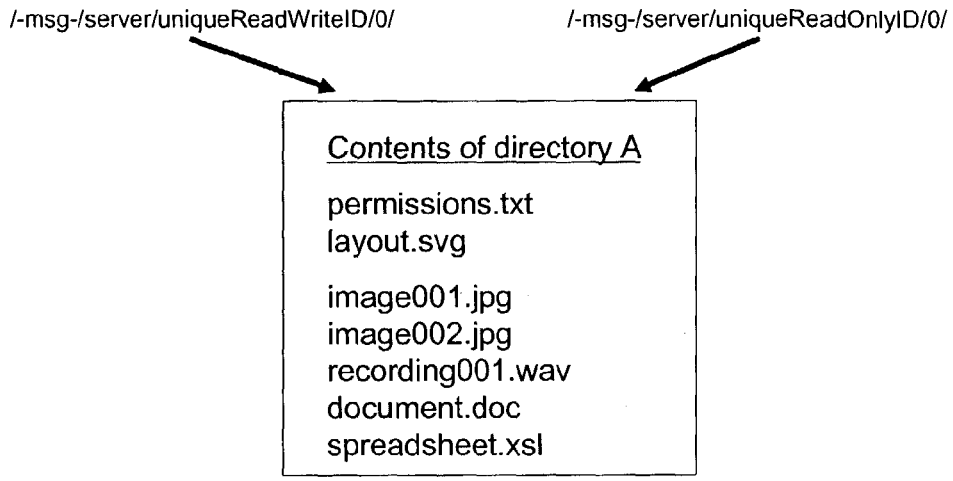
FIG. 24A illustrates one of the ways in which the region permissions can be implemented on the collection server.
FIG. 24B illustrates a second way of implementing region permissions for collection coversheets.
Figure 24:
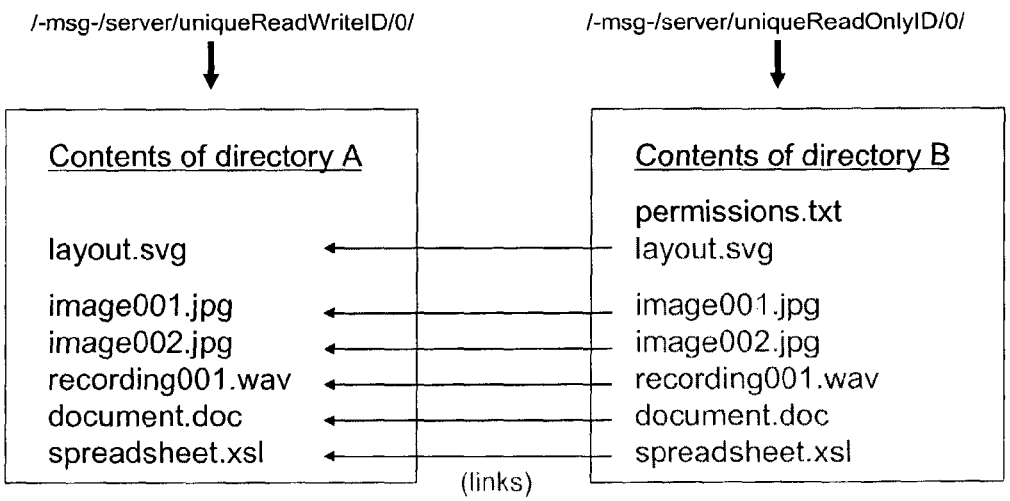

Two possible options for maintaining permission information are shown in FIGS. 24A and 24B. As shown in FIG. 24A, the permissions metadata can be kept in the directory containing the documents in the collection. This requires no duplication of data and only a single directory for each version of a collection. FIG. 24B shows an equally useful alternative where the directories are distinct but one uses links between the data files to avoid duplication of data. In the case of FIG. 24B, the permissions information is kept only in the directory where there are permission restrictions.

Since collections can be stored in hierarchies, there are times when a "read-only" collection contains another collection which might not be "read-only". The preferred way of handling hierarchy inside of a "read-only" collection is to provide a link to a "read-only" version of the contained collection. In other words, any collection A marked as read-only can only provide links to other read-only collections. If the collection B is added to the read-only collection A but does not have a read-only version, a new read-only collection C could be created for the collection B and the identifier for new collection C could be shared or stored in the original read-only collection A.

At 1400, if a coversheet is to be printed, it is printed at block 1402 as before described. In some cases, multiple coversheets might be printed so that a full permission coversheet is available as well as a restricted permission coversheet.

The "No" path is taken from block 1404 because this is not a printing task. At 1408, if the existing collection had contact information already associated with it and those were not removed by the user or if a list of recipients was given by the user at 1110, those recipients are notified by the appropriate method, including but not limited to email or fax.

Turning to the task entitled "Modify Existing Collection". "Modify Existing Collection" is essentially the same as "Add to Existing Collection" where what is added is nothing. The differences between the two tasks are described here briefly. The "No" paths are followed from blocks 712 and 716 since no additional media is needed or expected. "Modify Existing Collection" is selected at block 800. However, if "Add to Existing Collection" was selected but the only media made available to the MFP 100 was the coversheet of the collection to be modified, it would fall back to "Modify Existing Collection" allowing a new version without new media to be modified and annotated and then forward optionally to a different group of recipients. Also, if "Modify Existing Collection" were selected and some actions were requested on the collection coversheet, those actions could be performed as if "Perform Noted Actions" were selected instead. In block 610, a new version of the collection will be created, but no thumbnails are created, and no new media or documents will be uploaded to the collection server 108. All other blocks are essentially the same as with "Add to Existing Collection".

The "Perform Noted Actions" task is driven by annotations on a coversheet. Multiple coversheets can be marked up and all actions performed in sequence if all the coversheets are put into the ADF 308 at once.

Figure 15:
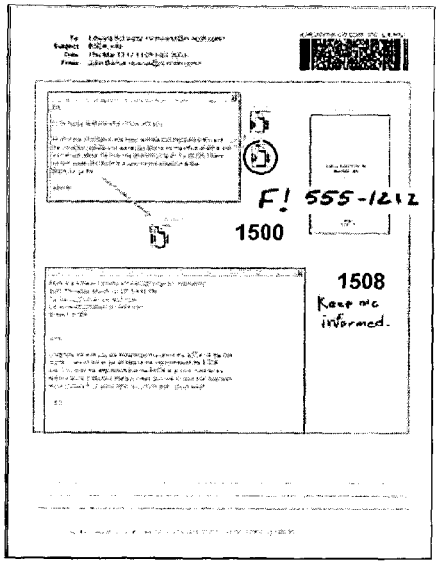
FIG. 15A shows an example coversheet with one fax action mark and one annotation.
FIG. 15B shows an example coversheet with an email action mark and a print action mark.
FIG. 15C shows an example coversheet with a grouping action mark.
Figure 15:
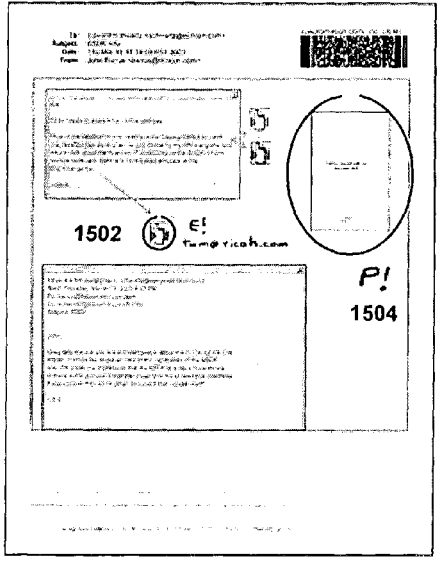
Figure 15:
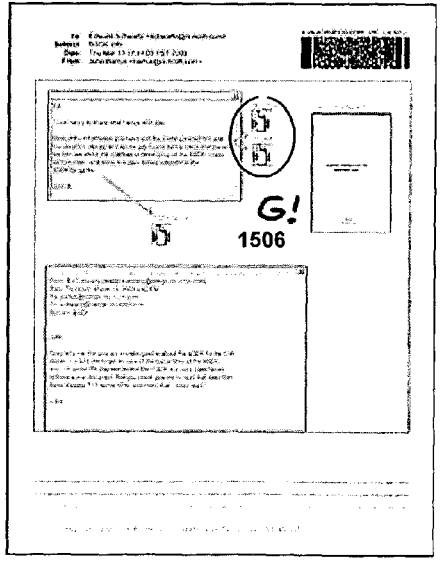

"Perform Noted Actions" is based on marks made on the collection overview on a coversheet. FIGS. 15A, 15B, and 15C show various marks that might be made on the overview part of a collection coversheet. FIG. 15A shows a coversheet 102 with an F! mark and a number drawn at 1500 near a circled document. At 1508, a note "Keep me informed" has been written on the overview. Neither of these marks are part of the original coversheet.

Marks on a coversheet can be extracted in a variety of ways at block 1008. If a special pen color such as red is used, that color could be detected in a color scan or image of the coversheet and all instances of that color in an image would be considered part of the marks made by the user. An alternative would be to compare the overview with an image based on the overview SVG file as previously described. Differences would be considered marks.

The types of marks that are interesting for the present invention are action marks which include, for instance, "F!", "E!", "P!", or "G!". These marks stand for "fax", "email", "print", and "group" and represent actions that can be taken on one or more documents or media in a collection. It will be recognized that this is not an exhaustive list of possibilities but a representative list of things that might be done with documents or media.

Once the marks are extracted from the overview, they could be analyzed to find action requests and circled documents at 1010. Optical Character Recognition software or OCR software could be used to locate and decode characters written in the marks. OmniPage Office from ScanSoft, Inc, of Peabody, Mass., USA sells software for finding characters in images.

Circled regions could be identified using a variety of known techniques. Many companies, such as Arbor Image Corporation in Ann Arbor, Mich., USA and Arc En Ciel Ltd based in London, England have raster to vector conversion tools. These tools can recognize circles in raster images. Such tools could be used to find circled documents.

Circled documents will need to have an action command near them. Some commands require additional information like a fax number or email address. If action commands are ambiguous, feedback can be provided to the user and the user can disambiguate the action request either using the MFP control panel 106.

Marks that are neither characters or circles could be recognized as annotations at 1012 to add to the overview at 1212.

FIGS. 15A, 15B, and 15C give some examples of action requests. The user in FIG. 15A put an "F!" mark and a number drawn at 1500 near a circled document on coversheet 102. The number by the "F!" is the requested fax number and "F!" indicates that the document indicated by the circle should be faxed. Multiple documents can be enclosed within a single circle indicating that the action should be performed on all the documents. At 1508, a note "Keep me informed" has been written on the overview. Since there is no action request, the marks are added to the overview as an annotation.

FIG. 15B shows two circles and two action commands. One document is circled and an "E!" and an email address is written near the circle at 1502. At 1504, another document is circled and a "P!" action command indicates the users request for a printout.

FIG. 15C shows a grouping request at 1506 where multiple documents are circled and a "G!" is written. The grouping operation consists of creating a new collection, moving the two documents or media into the new collection by adding them to the new collection and deleting them from the old collection. The new collection is then added to the old collection in approximately the same location as the original files.

Many such action requests could be imagined and driven by standard OCR and raster-to-vector conversion software.

The "Print Collection" task is different than most of the other tasks because no new collection or version is made. Multiple collections can be printed at once by providing the MFP 100 with multiple coversheets either in digital images or in the ADF 308. For each DRI found in an image or scan, the MFP 100 contacts the collection server 108 and retrieves documents and media.

Starting in block 600, the user provides the MFP with one or more DRIs of collections to be printed using the methods previously described for other tasks. At 800, "Print Collection" is chosen. At 604, if a DRI has not been provided through the handheld scanner, some media must be provided through the ADF 308, on the platen 309 or through some other device 112, 114, or 116. As in other tasks, the machine-readable code must be located and decoded in 1002. Some print actions might be driven by action requests as discussed in the "Perform Noted Actions" section. Those action requests are discovered in block 1002 and associated with the appropriate document in 1004. At 1006, if the current chosen task might have action requests that need to be discovered, for instance "Modify Existing Collection", the "Yes" path is taken and the marks are extracted 1008, analyzed 1010, and retained 1012 for later operation on the collection.

During the "Print Collection" task, a more limited set of user options and preferences might be displayed on the MFP control panel display 120 than those displayed for other tasks. After the execution of step 608, moving through step 1200 along the "No" path to 1206, the DRI associated with the coversheet is used to access the collection to be printed on the collection server 108. At 1208, the "Yes" path is taken since this is a print request.

In block 612, some modification of the message might be allowed as in other tasks, but if this is strictly a printing task, block 612 can be bypassed with no modifications and no upload of a new collection version.

At block 1400, no coversheet is need for a print request and the "No" path is taken to block 1404. Since printing has been requested specifically the "Yes" path is taken to block 1406 and each of the individual documents is printed as requested.

If in the user preferences block 608 at step 1120 the user has requested an opportunity to browse the collection, then at block 1316, the "Yes" path is taken to block 1318 and the user can browse the collection using the control panel 106 on the MFP 100. Browsing a collection of documents is similar to browsing on the World Wide Web. If a media document is shown in a collection and can be printed, then the user could be permitted to select the document and choose print. There are many examples of browsing styles using either direct manipulation with a mouse or using the cursor and tab keys to move between selectable objects like documents. Those skilled in the art will have seen many different approaches to browsing and selecting and the user interface is not described here but has the following properties: providing access to all documents and media objects in the collection, providing the opportunity to replace the current collection overview shown in the display with the selected object, including but not limited to a collection contained in the current collection, providing a way of executing commands like 'print', 'view', 'delete', or other commands as appropriate, and providing a way of moving back up the collection hierarchy after descending into other collections.

Figure 17:
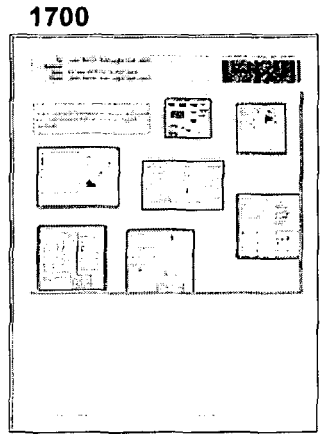
FIG. 17A shows an example coversheet of a collection which will be explored.
FIG. 17B shows a pictorial representation of the collection overview for the collection whose coversheet is shown in FIG. 17A as it might appear on a display device.
FIG. 17C shows a pictorial representation of a new collection overview that was selected during the course of exploring the containing collection.
Figure 17:
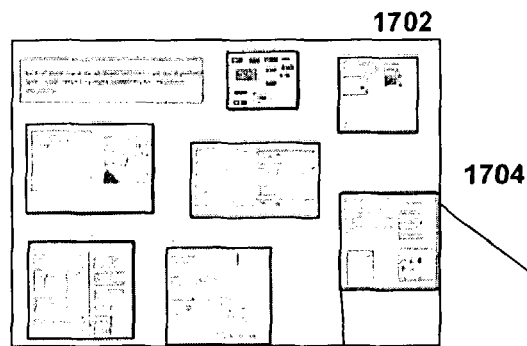
Figure 17:
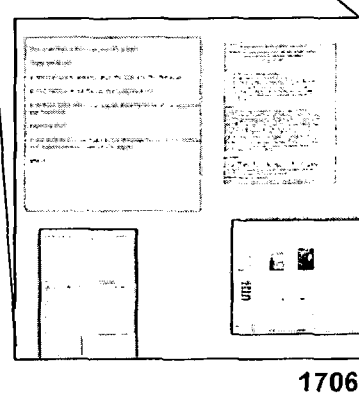

FIGS. 17A, 17B, and 17C show a collection being browsed as it might appear on display 120 of the MFP control panel 106. FIG. 17A shows a collection coversheet 1700. At FIG. 17B, the overview 1702 from the coversheet 1700 is displayed on the MFP 100 display 120. The collection shown contains one text box and seven collections. One collection 1704 is selected and expanded and the overview 1706 from that collection is displayed on the MFP 100 display 120. The newly displayed overview 1706 shows that the collection contains two collections, a text note, and one page of a document.

If some of the collection has been printed at 1318, there is no need to print at 1404 and the "No" path is taken as well as the "No" path for 1406 since there is no need for notification when printing.

Another task to consider is the task titled "Merge Collections" in block 800. A user might have multiple coversheets representing documents and media in more than one collection. If the user desires to combine the documents and media contained in all of the collections into a single collection, she might choose the "Merge Collections" task. FIGS. 20A, 20B, 20C, and 21 show a special case of merging of different versions of a collection but the technique is applicable to merging any group of collections.

The most trivial way to "merge" collections of course is to create a new collection which contains all of the other collections in a hierarchical message where each of the "merged" collections is represented as a thumbnail in the new collection overview and is accessible from the new collection. However, sometimes the user would want the documents and media merged into a single collection with no hierarchy.

The task when merging is to place all of the documents and media into a single collection on the collection server. At the same time, an overview should be created which contains all of the thumbnails of the media.

Particularly in the special case of merging versions of a collection, some media might be redundant in that it is contained in both versions of the collection and only some media is only contained in one. For instance, in FIG. 21, the overviews of five different versions of a collection are shown 2100, 2002, 2102, 2000, and 2004. Versions 2 2102 and 3 2002 were both based on version 1 2100 and therefore have some common documents. Version 4 2000 is based on version 3 2002. Version 5 2004 will represents the new merged version is based on version 4 2000 because version 4 of the collection contains more unique documents or perhaps was created most recently of all the versions.

The user could take the coversheet for any existing version of the collection and place it in the ADF 308 and select "Merge Collections". Since there is only one coversheet, the MFP 100 could try to merge the terminal versions of the collection indicated and could begin by verifying that the user wanted to merge the various versions of the collection into a single collection. If the user indicated in the affirmative, then the MFP 100 could gather information about all the versions of this collection 2100, 2002, 2102, and 2000 represented by the DRI on the coversheet and begin to merge the versions. In all cases, only the terminal versions of the collection need to be merged. Another way to say it is that if the version hierarchy forms a graph where version 1 2100 is the root of the tree, the only leaves of the graph are version 4 2000 and version 3 2002. By looking at the hierarchy of the collection, only version 4 2000 and version 3 2002 have not been used to create on of the other versions of the message.

Figure 20:
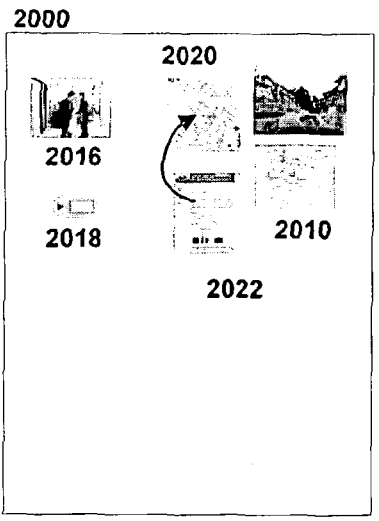
FIG. 20A shows an example overview of a collection containing several documents, pictures, and other media.
FIG. 20B shows an example of an overview of a different collection which contains some of the same documents, pictures, and other media but which also contains different media also.
FIG. 20C shows an overview of a collection that is the result of the merging two similar collections into a single collection.
Figure 20:
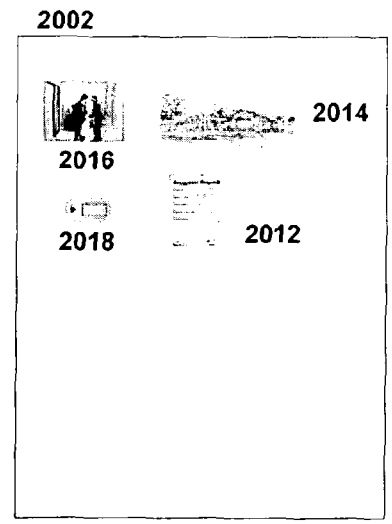
Figure 20:
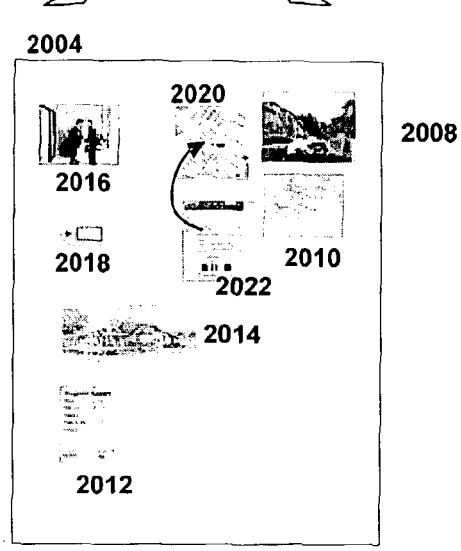

FIGS. 20A, 20B, and 20C show a more detailed view of the merging operation. The first task when merging is to compare the collections and find all of the documents and media that are in both collections or both versions. In FIGS. 20A and 20B, only the image in the upper left of the overview 2016 and the audio directly below the image 2018 are in both collections. The remaining documents and media 2008, 2010, 2012, 2020, and 2022 are only in one version of the collection.

First the common documents and media are placed as close to their original position as possible. Second, the unique documents and media from one of the collections is placed in the new collection or new version. In the case of creating a new merged version, it ios preferable to do the first two steps by creating a new version of the message from one of the leaves and in this example, version 4 2000 is chosen because it contains more documents than version 3 2002. Then, taking the unique documents from version 3 2002, each document is copied to the collection server 108 and the thumbnails are added to the collection overview as shown in FIGS. 18 and 19. Alternatively, the remaining documents could be added to the new version in their current configuration below the bounding box of the common documents. FIG. 20C shows the end result of the version merge where all media and documents are now contained in a single version of the collection, version 5, whose overview 2004 is shown in FIG. 20C and FIG. 21. At the users discretion or request, the annotations from both collections or both versions of the collection are also transferred. Annotations which have endpoints on documents or cross documents will be kept with the documents and other annotations will be placed where appropriate. At the user's request in block 608, the new collection could be presented for modification in block 612 and annotations could be redrawn or deleted and the document and media thumbnails could be moved or resized, even deleted if so desired. Finally, in block 1400, the newly merged collection coversheet could be printed. If there were email addresses or contact information associated with the collection, the contact information could be merged in a similar manner so that everyone listed as a recipient of notification in both collections would be added to the new collection.

As noted above, new versions of collections can be created from any existing version of a collection. Version 3 2002 and version 4 2000 are from the same collection but contain different media and were created from different versions of the collection. Sometimes, in order to reduce branching of collection versions, the user might want to always add information to the most recent version of a collection instead of adding it to the version. The version which ends in /0/ is a special version which means "the latest" version. Whenever the user uses the /0/ DRI in an operation at the MFP 100, the MFP tries to base the operation on the latest version of the collection in the collection server. 11811 One task available to users of the present invention is to print out the /0/ version of the coversheet given any other version. For this task, the user presents any version of a coversheet to the MFP 100 in any of the aforementioned ways, indicates to the MFP at block 800 on the control panel 106 that the /0/ coversheet should be printed. The MFP 100 talks to the collection server 108 to retrieve the latest version of the collection. When the coversheet 102 is printed, the machine-readable 504 and human-readable 510 DRIs both end in /0/ and whenever that coversheet is used to modify a collection, the modifications are made to the most recently uploaded collection.

It should be noted that although this specification specifically refers to a single collection server, there are many ways to distribute information so that collections are kept in multiple places and made accessible from multiple places. It is well understood in the art how to distribute files so that they are available locally even if they were created somewhere distant. Also, there is nothing that prevents the existence of multiple collection servers, particularly when using the DRIs described as part of the present invention which have as part of their name the machine on which the collection was originally created.

There are times when part of all of a collection should be restricted to be either read-only or add-only. The two remaining tasks shown in block 800 are "Make Read-only Coversheet" and "Make Add-only Coversheet". Elements of both of those tasks have already been described in conjunction with the descriptions of blocks 1124, 1310, and 1312 during the "Add to Existing Collection" and "Modify Existing Collection" task descriptions. One possible modification to an existing collection is just to restrict the operations that can be done on the collection.

If the user would like to create a collection that cannot be modified, she could take the coversheet of an existing collection and select the "Make Read-only Collection" task in block 800. The MFP 100 would present the collection overview in block 1312 after following the flow of the invention appropriately through FIGS. 7-13 as has been described for other related tasks. At 1312, the user would be permitted to draw or sketch regions and assign permissions to those regions in order to restrict the operations on each of the documents and media in the collection.

Figure 22:
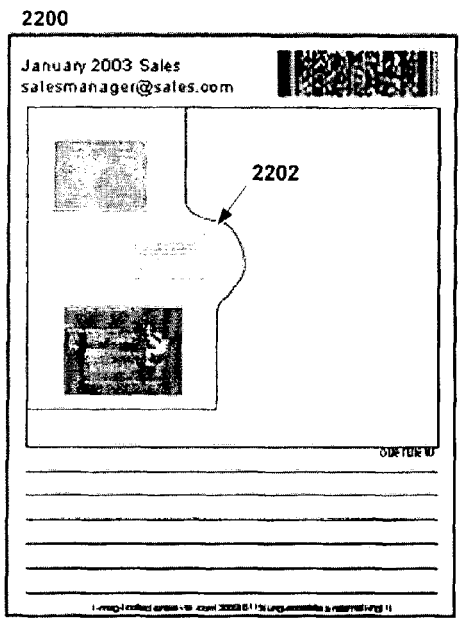
FIG. 22A shows an example coversheet representing a collection in which part of the overview is read-only.
FIG. 22B shows an example coversheet showing a collection in which part of the overview is read-only after media has been added to the collection.
Figure 22:
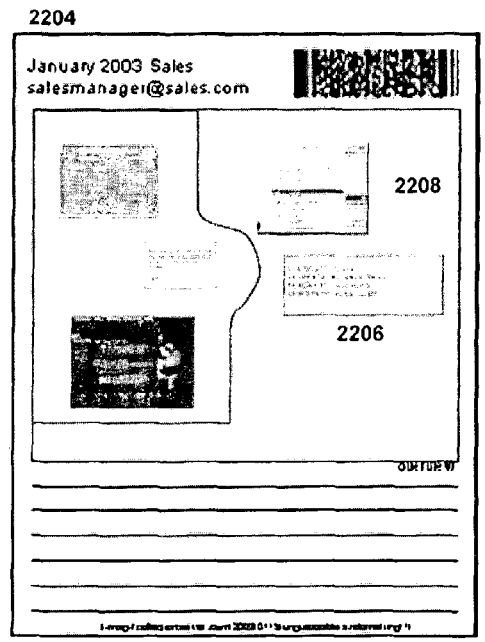

Suppose the user wanted to create some instructions which she did not want modified but then still wanted other users to be able to add documents and annotations to the collection. As shown in FIG. 22A, the user can sketch a region 2202 which protects the part of the overview she would like to remain static, leaving the remaining overview region available for adding notes, annotations and other media.

If a second user brings the coversheet with the read-only region to the MFP 100 to add some documents, those documents will be added only to the region which is not protected as shown in FIG. 22B. Documents 2208 and 2206 have been added in FIG. 22B and were placed outside the read-only region defined by the first user.

Figure 23:
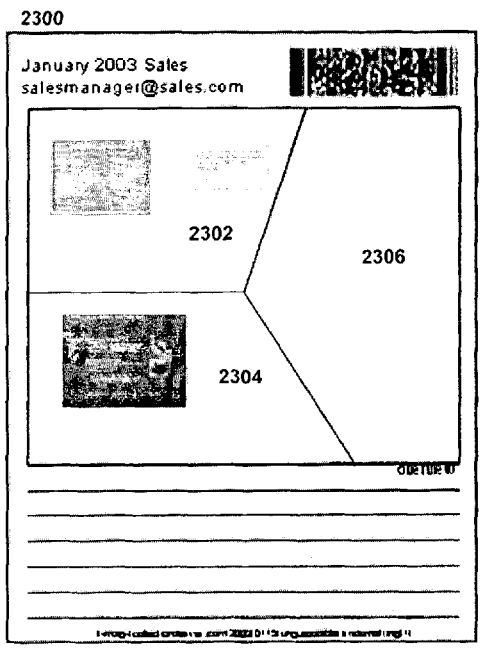
FIG. 23A shows an example of a collection coversheet in which the overview is divided into three separate regions where two of the regions have read-only permissions and the remaining region has read-write permission.
FIG. 23B shows the same collection coversheet shown in FIG. 23A after new media has been added to the collection.
Figure 23:
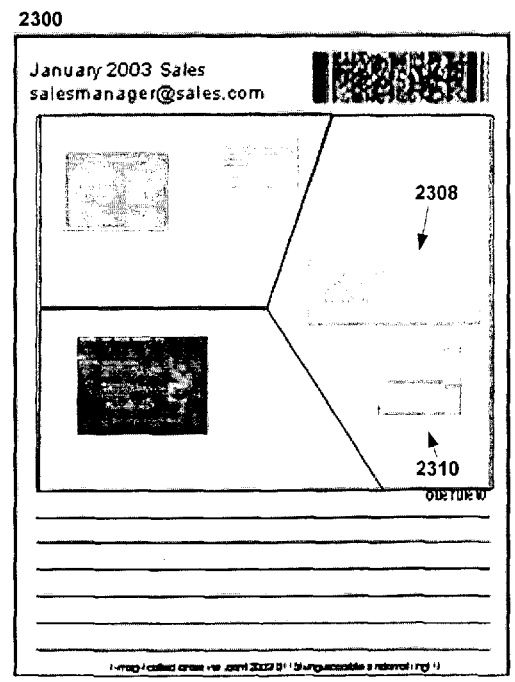

A second example is shown in FIGS. 23A and 23B where there are 3 regions defined. Regions 2302 and 2304 on coversheet 2300 are both read-only. Only region 2306 has both read and write permissions. After using the coversheet 2300 to add some documents to the collection, the coversheet looks like it does in FIG. 23B where documents 2308 and 2310 have been added. Another person might have a coversheet where 2304 has full permission but 2302 and 2306 are restricted as read-only. That person can only add and modify things in region 2304. This provides a shared space where each coversheet represents an area which can be modified and at the same time providing access to information added to other regions.

An "Add-only" coversheet can be made using the same technique as the read-only coversheet only the restriction is that people can add documents to the add-only region but not see what has been added.

The present invention has been described in connection with a specific implementation of a typical embodiment thereof. It will be understood by those skilled in the relevant art that many changes can be made without departing from the true spirit and scope of the present invention. Therefore, it is intended by the appended claims to cover all such changes and modifications which come within the true spirit and scope of this invention.

What is claimed is:

1. A method for accessing a collection of documents comprising:

receiving, at a computer processing system, an image of a collection coversheet, the coversheet having an overview area within which a plurality of first graphics are arranged, some of the first graphics representing documents associated with the collection of documents, wherein the documents associated with the collection of information are stored on one or more remote collection servers, wherein the coversheet includes information relating to accessing documents in the collection of documents;

identifying, at the computer processing system, a collection identifier from the image, the collection identifier indicative of a storage location of the collection of documents on the one or more remote collection servers, wherein the collection identifier also includes a randomly generated component that does not correlate with the storage location to prevent unauthorized access to the collection of documents, wherein the collection identifier further includes a version identifier, the version identifier identifying a version of the collection, wherein a new version of the collection is generated each time that a modification is made to the collection, and wherein a different version of the collection may be accessed by modifying the collection identifier to refer to a different version of the collection;

presenting, at the computer processing system, a plurality of second graphics, each second graphic corresponding to a user action;

detecting, at the computer processing system, a user-selection indicating a selection of one or more of the first graphics and a second graphic, the second graphic representing a user action to be performed and the one or more of the first graphics each representing a document from the collection of documents upon which the user action is to be performed; and performing, at the computer processing system, the user action corresponding to the selected second graphic upon each document corresponding to the selected one or more first graphics, the document being stored on at least one of the remote collection servers, wherein the step of receiving an image of a collection coversheet includes scanning in a paper copy of the collection coversheet.

2. The method of claim 1 wherein the image of a collection coversheet is an electronic representation of the collection coversheet.

3. The method of claim 1 wherein the user-selection represents one or more documents and the user-action is one of displaying the one or more documents, printing the one or more documents, communicating the one or more documents to one or more users, and grouping the one or more documents into a group.

4. The method of claim 1 wherein one of the graphics includes a graphic associated with a second collection, the method further comprising detecting user input indicating selection of the graphic, wherein the step of presenting information is a step of presenting elements comprising the second collection.

5. The method of claim 1 wherein the step of presenting comprises displaying information on a visual display device.

6. A method for processing information comprising:

receiving, at a computer processing system, first information representative of a first collection of information, the first collection of information comprising a plurality of documents, the first information comprising a collection identifier and a plurality of images, the collection identifier being associated with the first collection of documents, each document of the plurality of documents being represented by one of the images, the first collection of information being stored on at least one remote collection server, wherein the collection identifier also includes a randomly generated component that does not correlate with the storage location to prevent unauthorized access to the collection of documents, wherein the collection identifier further includes a version identifier, the version identifier identifying a version of the collection, wherein a new version of the collection is generated each time that a modification is made to the collection, and wherein a different version of the collection may be accessed by modifying the collection identifier to refer to a different version of the collection;

presenting the images at the computer processing system;

detecting, at the computer processing system, a user selection, the user selection indicative of a selected image;

detecting, at the computer processing system, a user action; and performing, at the computer processing system, the user action on an electronic document associated with the selected image, wherein the step of receiving includes scanning in a collection coversheet, the images being formed on the collection coversheet.

7. The method of claim 6 wherein the selected image represents a document, and the user action is one of displaying the document, printing the document, and sending the document.

8. The method of claim 6 wherein the selected image represents a document and the action is one of creating a new collection of information, the new collection of information comprising as at least the document.

9. The method of claim 6 wherein the steps of detecting a user selection and detecting a user action include detecting input from one or more input devices.

10. The method of claim 6 wherein the steps of detecting a user selection and detecting a user action include detecting graphics from among the images representative of the user selection and of the user action.

11. The method of claim 6 wherein the step of presenting the collection of images includes determining a layout and displaying the images according to the layout, wherein determining the layout is performed without user-provided directions for the layout.

12. The method of claim 11 wherein the first collection of information further comprises one or more nested collections, each nested collection being represented by one of the images, wherein the step of presenting the collection of images includes determining a layout and displaying the graphics according to the layout, wherein an image that represents one of the nested collections includes one or more images representative of elements comprising the nested collection.

13. The method of claim 6 wherein the selected image represents a nested collection, and the user action is a step of presenting elements comprising the nested collection.

14. The method of claim 6 wherein the steps of presenting comprise displaying information on a visual display device.

15. The method of claim 6 wherein the steps of presenting comprise displaying information on a PDA.

16. The method of claim 6 wherein the collection identifier is a bar machine-readable code.

17. The method of claim 16 wherein the machine-readable code is a bar code.

18. The method of claim 6 wherein the collection identifier is further associated with one or more access permissions, wherein images presented in the step of presenting are based on the access permissions.

19. The method of claim 18 wherein the step of performing the user action is conditional on an access permission with the electronic document.

20. The method of claim 18 wherein the collection coversheet includes an overview area, the images are arranged within one or more access regions which define the overview area, wherein the one or more access permissions are associated with the access regions, wherein access to the electronic document is further based on the access permission of the access region within which the selected image is arranged.

21. A computer program product for processing information, the computer program product comprising a computer readable medium, the computer readable medium having stored thereon computer program code configured to operate a computer processing system to perform the method steps of:
receiving an electronic data representation of a coversheet, the coversheet comprising a collection identifier which identifies a collection of information stored on at least one remote collection server, the electronic data representation of the coversheet including information relating to accessing documents in the collection of information, the coversheet further comprising an overview area having arranged therein one or more graphics representative of elements of the collection of information, wherein the collection identifier includes a randomly generated component that does not correlate with the storage location to prevent unauthorized access to the collection of documents, wherein the collection identifier further includes a version identifier, the version identifier identifying a version of the collection, wherein a new version of the collection is generated each time that a modification is made to the collection, and wherein a different version of the collection may be accessed by modifying the collection identifier to refer to a different version of the collection;
detecting the collection identifier from the electronic data representation, wherein the collection identifier is associated with at least one access permission;
presenting one or more of the graphics in a representation of the collection, wherein the one or more graphics which are presented are determined based on the access permission;
detecting a user selection, the user selection indicating a selected element in the collection of information; and
detecting a user action and in response thereto conditionally performing the user action on the selected element based on the access permission,
wherein the electronic data representation is a scanned image of the coversheet.

22. The computer program product of claim 21 wherein the steps of detecting a user selection and detecting a user action include detecting input from one or more input devices.

23. The computer program product of claim 21 wherein the steps of detecting a user selection and detecting a user action include detecting graphics from among the images representative of the user selection and of the user action.

24. The computer program product of claim 21 wherein the overview area comprises one or more access regions within which the graphics are arranged, the access regions having associated therewith a plurality of access permissions, the collection identifier being associated with the access permissions, wherein the one or more graphics which are presented are determined based on the access permission of the respective access region in which the graphics are arranged.

25. The computer program product of claim 21 wherein one or more graphics are displayed on a visual display device.

26. A method for processing information comprising:
receiving, at a computer processing system, an image of a collection coversheet, the collection coversheet including information relating to accessing documents in a collection of information, the coversheet having an overview area within which a plurality of graphics are arranged, some of the graphics representing documents associated with the collection of information, the collection of information being stored on at least one remote collection server;
identifying, at the computer processing system, a collection identifier from the image, the collection identifier associated with the collection of information, wherein the collection identifier includes a randomly generated component that does not correlate with the storage location to prevent unauthorized access to the collection of documents, wherein the collection identifier further includes a version identifier, the version identifier identifying a version of the collection, wherein a new version of the collection is generated each time that a modification is made to the collection, and wherein a different version of the collection may be accessed by modifying the collection identifier to refer to a different version of the collection;
detecting, at the computer processing system, a first graphic in the image, the first graphic associated with a document;
detecting, at the computer processing system, a second graphic in the image, the second graphic associated with an action to be performed on the document; and
performing, at the computer processing system, the action, including accessing the document stored on the at least one remote collection server based on the collection identifier,
wherein the step of receiving an image of a collection coversheet includes scanning in a paper copy of the collection coversheet.

27. The method of claim 26 wherein the collection identifier is associated with an access permission, wherein the step of performing the action is conditional based on the access permission.

28. The method of claim 26 wherein the overview area comprises one or more access regions, wherein the collection identifier is associated with a plurality of access permissions for the access regions, the step of performing the action includes determining whether there is permission to perform the action based on the access permission of the respective access region within which the first graphic is arranged.

29. The method of claim 26 wherein the action is an action to display the document.

30. The method of claim 26 wherein the action is a print action.

31. The method of claim 26 wherein the action is an action to send the document to one or more recipients, the second graphic further including information indicative of the one or more recipients.

32. The method of claim 26 wherein the action is one of creating a new collection, the method further comprising receiving additional information, associating the new information with the new collection, associating the document with the new collection, and creating a new coversheet, the new coversheet having formed thereon a second collection identifier, a document image representing the document, and one or more new images representing the additional information.

33. The method of claim 26 wherein the collection identifier is a machine-readable code.

34. The method of claim 33 wherein the machine-readable code is a bar code.

35. Apparatus for accessing information comprising:
   a data capture device; and
   a computer processing device, operatively coupled to the data capture device,
   the data capture device configured to scan in a paper copy of a collection coversheet to produce image data, the collection coversheet being associated with a collection of information and comprising a collection identifier and an overview area within which one or more graphics are arranged, the collection of information comprising one or more documents which are represented by some of the graphics, the collection coversheet including information relating to accessing documents in the collection of information, the collection of information being stored on at least one remote collection server,
   the computer processing device including computer programs that, when executed by the computer processing device, causes the computer processing device to perform method steps of:
   identifying the collection identifier from the image data, the collection identifier associated with the collection of information, wherein the collection identifier includes a randomly generated component that does not correlate with the storage location to prevent unauthorized access to the collection of documents, wherein the collection identifier further includes a version identifier, the version identifier identifying a version of the collection, wherein a new version of the collection is generated each time that a modification is made to the collection, and wherein a different version of the collection may be accessed by modifying the collection identifier to refer to a different version of the collection;
   detecting a first graphic in the image data, the first graphic associated with at least one document;
   detecting a second graphic in the image data, the second graphic associated with an action to be performed on the document; and
   performing the action, including accessing the document on the at least one remote collection server based on the collection identifier.

36. The apparatus of claim 35 wherein the collection identifier is associated with an access permission, the step of performing the action includes being conditional on the access permission.

37. The apparatus of claim 35 wherein the overview area comprises one or more access regions, wherein the collection identifier is associated with a plurality of access permissions for the access regions, the step of performing the action includes determining whether there is permission to perform the action based on the access permission of the respective access region within which the first graphic is arranged.

38. A method of accessing a collection of information comprising:
   receiving, at a computer processing system, an identifier, the identifier being associated with a collection of information, the collection of information being associated with one or more electronic documents, the collection of information being stored on at least one remote collection server, wherein the identifier also includes a randomly generated component that does not correlate with the storage location to prevent unauthorized access to the collection of documents, wherein the identifier further includes a version identifier, the version identifier identifying a version of the collection, wherein a new version of the collection is generated each time that a modification is made to the collection, and wherein a different version of the collection may be accessed by modifying the collection identifier to refer to a different version of the collection;
   obtaining, at the computer processing system, a representation of at least a portion of the collection of information;
   detecting, at the computer processing system, user-provided annotations located in the representation, the user-provided annotations indicative of one or more actions to be performed on at least some part of the collection of information, wherein the user-provided annotations comprise a character string indicative of the one or more actions to be performed and a mark or set of marks encircling the at least some part of the collection upon which the actions are to be performed, the character string being proximate to the mark or set of marks encircling the at least some part of the collection; and
   performing the one or more actions indicated by the annotations on at least some part of the collection of information stored on the at least one remote collection server;
   wherein receiving an identifier includes scanning an image formed on paper, the image including an image of the identifier and an image of the representation of at least a portion of the collection of information.

39. The method of claim 38 wherein detecting includes receiving user input from a user, the user-provided annotations comprising the user input.

* * * * *